US012586217B2

(12) United States Patent
Son et al.

(10) Patent No.: US 12,586,217 B2
(45) Date of Patent: Mar. 24, 2026

(54) VISION SENSOR, OPERATING METHOD OF VISION SENSOR, AND IMAGE PROCESSING DEVICE INCLUDING THE VISION SENSOR

(71) Applicant: Samsung Electronics Co., Ltd., Suwon-si (KR)

(72) Inventors: Bongki Son, Suwon-si (KR); Junseok Kim, Suwon-si (KR); Keunjoo Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 259 days.

(21) Appl. No.: 18/490,178

(22) Filed: Oct. 19, 2023

(65) Prior Publication Data

US 2024/0312026 A1 Sep. 19, 2024

(30) Foreign Application Priority Data

Mar. 14, 2023 (KR) ........................ 10-2023-0033471
May 10, 2023 (KR) ........................ 10-2023-0060705

(51) Int. Cl.
*G06T 7/246* (2017.01)
(52) U.S. Cl.
CPC .... *G06T 7/248* (2017.01); *G06T 2207/20076* (2013.01); *G06T 2207/30232* (2013.01)
(58) Field of Classification Search
CPC ...................................................... G06T 7/248
See application file for complete search history.

(56) References Cited

U.S. PATENT DOCUMENTS

| | | | |
|---|---|---|---|
| 9,386,224 | B2 | 7/2016 | Sakurai |
| 10,334,149 | B2 | 6/2019 | Baldwin et al. |
| 10,728,489 | B2 | 7/2020 | Donsbach et al. |
| 10,754,411 | B2 | 8/2020 | Kim et al. |
| 11,240,430 | B2 | 2/2022 | Moloney et al. |
| 11,455,873 | B2 | 9/2022 | Wong |
| 2011/0274334 | A1* | 11/2011 | Zhu ........................ G06T 7/248 |
| | | | 382/132 |
| 2018/0143701 | A1* | 5/2018 | Suh ...................... H04N 25/709 |
| 2020/0134827 | A1* | 4/2020 | Saha ...................... G06V 20/13 |

FOREIGN PATENT DOCUMENTS

| | | |
|---|---|---|
| KR | 10-2021-0133634 A | 11/2021 |
| KR | 102338503 B1 | 12/2021 |
| KR | 10-2022-0049159 A | 4/2022 |

* cited by examiner

*Primary Examiner* — Pinalben Patel
(74) *Attorney, Agent, or Firm* — Harness, Dickey & Pierce, P.L.C.

(57) ABSTRACT

According to the vision sensor, the operating method of the vision sensor, and the image processing device according to the inventive concepts, event data may be generated in response to the movement of an object, a plurality of pieces of comparison data may be generated by comparing each of a plurality of pieces of event data respectively corresponding to a plurality of sub regions with reference data, a motion count value may be updated by comparing each of the plurality of pieces of event data respectively corresponding to the plurality of sub regions with a first threshold value, and whether an object moves may be determined by comparing an updated final motion count value with a second threshold value.

17 Claims, 17 Drawing Sheets

Figure 10:
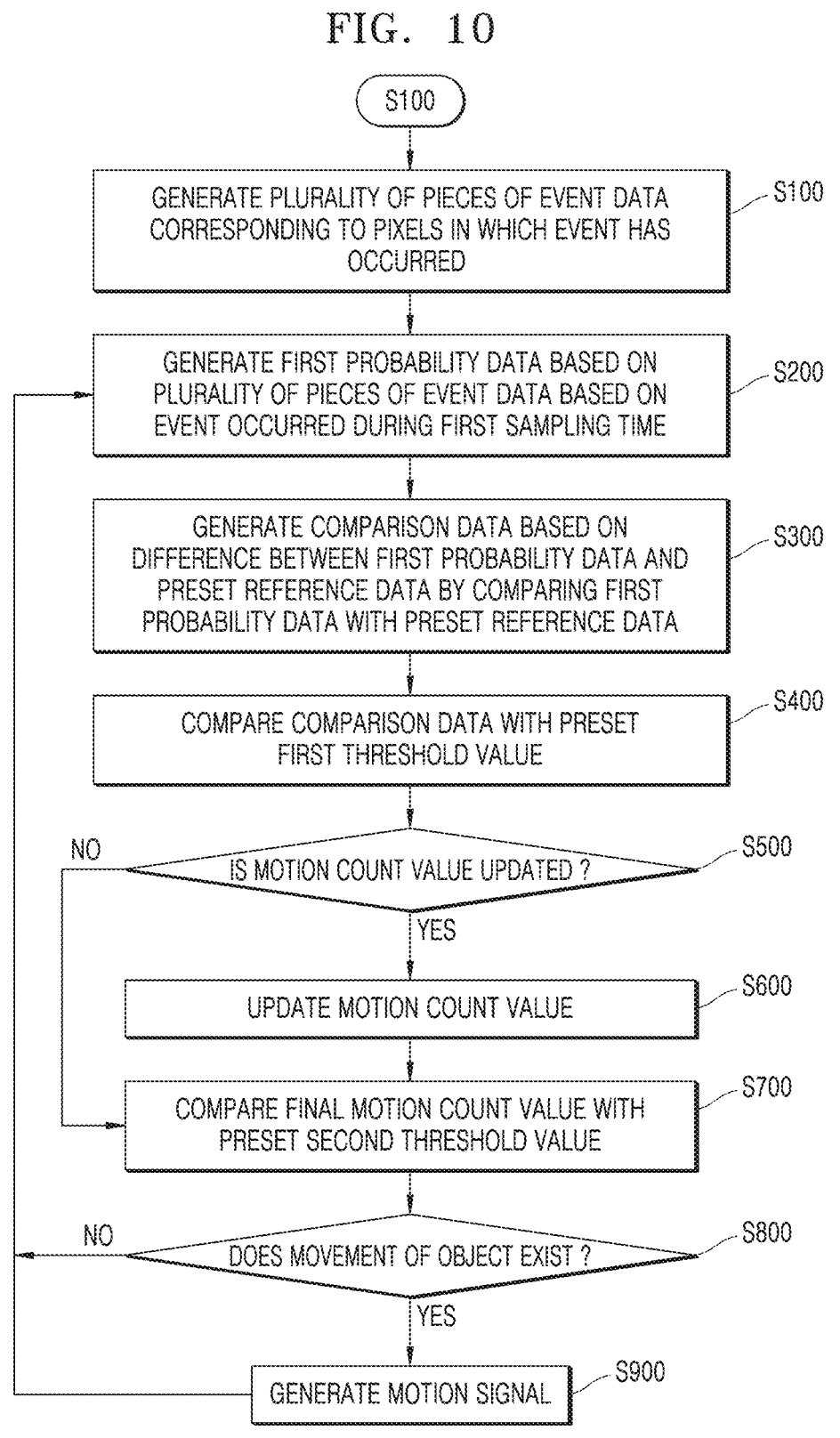

```
                        ( S100 )
                           │
                           ▼
┌──────────────────────────────────────────────┐
│   GENERATE PLURALITY OF PIECES OF EVENT DATA   │── S100
│  CORRESPONDING TO PIXELS IN WHICH EVENT HAS    │
│                   OCCURRED                      │
└──────────────────────────────────────────────┘
                           │
                           ▼
┌──────────────────────────────────────────────┐
│   GENERATE FIRST PROBABILITY DATA BASED ON     │── S200
│  PLURALITY OF PIECES OF EVENT DATA BASED ON    │
│  EVENT OCCURRED DURING FIRST SAMPLING TIME     │
└──────────────────────────────────────────────┘
                           │
                           ▼
┌──────────────────────────────────────────────┐
│      GENERATE COMPARISON DATA BASED ON         │── S300
│ DIFFERENCE BETWEEN FIRST PROBABILITY DATA AND  │
│   PRESET REFERENCE DATA BY COMPARING FIRST     │
│ PROBABILITY DATA WITH PRESET REFERENCE DATA    │
└──────────────────────────────────────────────┘
                           │
                           ▼
┌──────────────────────────────────────────────┐
│     COMPARE COMPARISON DATA WITH PRESET        │── S400
│          FIRST THRESHOLD VALUE                  │
└──────────────────────────────────────────────┘
                           │
                           ▼
   NO        ◇ IS MOTION COUNT VALUE UPDATED ? ◇── S500
   ◄─────────
              │ YES
              ▼
┌──────────────────────────────────────────────┐
│         UPDATE MOTION COUNT VALUE              │── S600
└──────────────────────────────────────────────┘
              │
              ▼
┌──────────────────────────────────────────────┐
│  COMPARE FINAL MOTION COUNT VALUE WITH         │── S700
│     PRESET SECOND THRESHOLD VALUE              │
└──────────────────────────────────────────────┘
              │
              ▼
   NO        ◇ DOES MOVEMENT OF OBJECT EXIST ? ◇── S800
   ◄─────────
              │ YES
              ▼
        ┌──────────────────────┐
        │  GENERATE MOTION SIGNAL │── S900
        └──────────────────────┘
```

FIG. 11

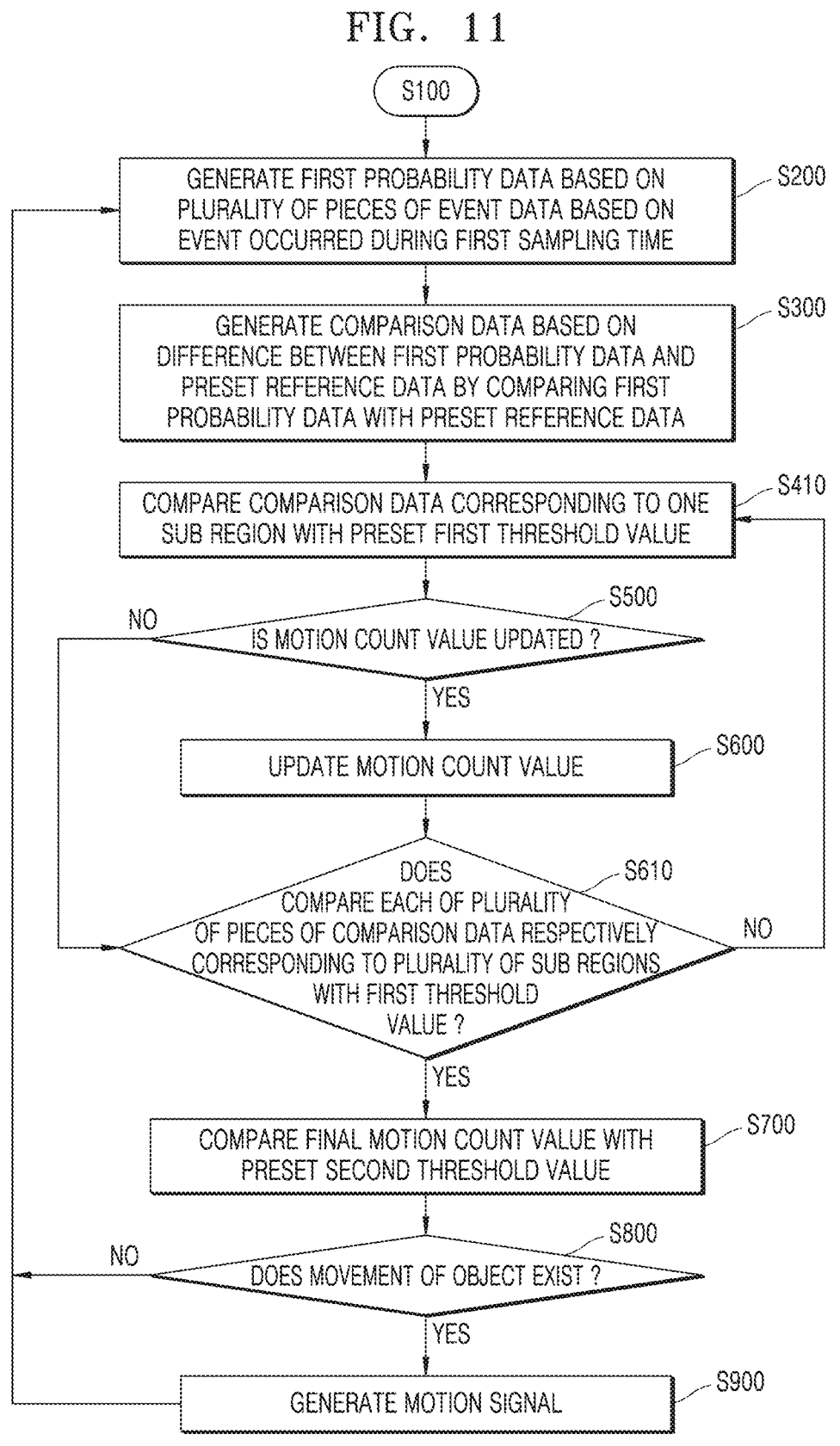

```
( S100 )
   │
   ▼
┌─────────────────────────────────────────────┐
│ GENERATE FIRST PROBABILITY DATA BASED ON     │ ── S200
│ PLURALITY OF PIECES OF EVENT DATA BASED ON   │
│ EVENT OCCURRED DURING FIRST SAMPLING TIME    │
└─────────────────────────────────────────────┘
   │
   ▼
┌─────────────────────────────────────────────┐
│ GENERATE COMPARISON DATA BASED ON            │ ── S300
│ DIFFERENCE BETWEEN FIRST PROBABILITY DATA AND│
│ PRESET REFERENCE DATA BY COMPARING FIRST     │
│ PROBABILITY DATA WITH PRESET REFERENCE DATA  │
└─────────────────────────────────────────────┘
   │
   ▼
┌─────────────────────────────────────────────┐
│ COMPARE COMPARISON DATA CORRESPONDING TO ONE │ ── S410
│ SUB REGION WITH PRESET FIRST THRESHOLD VALUE │
└─────────────────────────────────────────────┘
   │
   ▼
  NO ◇ IS MOTION COUNT VALUE UPDATED ? ── S500
   │            │ YES
   │            ▼
   │   ┌───────────────────────────┐
   │   │ UPDATE MOTION COUNT VALUE │ ── S600
   │   └───────────────────────────┘
   │            │
   │            ▼
   │   DOES
   │   COMPARE EACH OF PLURALITY
   │   ◇ OF PIECES OF COMPARISON DATA RESPECTIVELY ── S610 ── NO
   │   CORRESPONDING TO PLURALITY OF SUB REGIONS
   │   WITH FIRST THRESHOLD
   │   VALUE ?
   │            │ YES
   │            ▼
   │   ┌───────────────────────────────────┐
   │   │ COMPARE FINAL MOTION COUNT VALUE   │ ── S700
   │   │ WITH PRESET SECOND THRESHOLD VALUE │
   │   └───────────────────────────────────┘
   │            │
   │            ▼
  NO ◇ DOES MOVEMENT OF OBJECT EXIST ? ── S800
   │            │ YES
   │            ▼
   │   ┌───────────────────────────┐
   └───│ GENERATE MOTION SIGNAL    │ ── S900
       └───────────────────────────┘
```

VISION SENSOR, OPERATING METHOD OF VISION SENSOR, AND IMAGE PROCESSING DEVICE INCLUDING THE VISION SENSOR

CROSS-REFERENCE TO RELATED APPLICATION

This application is based on and claims priority under 35 U.S.C. § 119 to Korean Patent Application No. 10-2023-0033471, filed on Mar. 14, 2023, and 10-2023-0060705, filed on May 10, 2023, in the Korean Intellectual Property Office, the disclosures of which are incorporated by reference herein in their entirety.

BACKGROUND

The inventive concepts relate to vision sensors, operating methods of the vision sensors, and image processing devices including the vision sensors, and more particularly, to vision sensors determining the presence or absence of a moving object by comparing probability data based on event data with preset data, operating methods of the vision sensors, and image processing devices including the vision sensors.

A vision sensor, e.g., an active vision sensor, generates when an event (e.g., a change in light intensity) occurs, information about the event, that is, event data, and transfers the event data to a processor.

Meanwhile, an event may occur due to a change in light intensity. However, an event occurs due to movement below a certain level due to shaking of the vision sensor, etc., and an unnecessary detection process may be performed. There is a need for research on a vision sensor to sense an event caused by movement above a certain level to be detected.

SUMMARY

The inventive concepts provide vision sensors capable of determining the presence or absence of movement above a certain level, operating methods of the vision sensors, and image processing devices including the vision sensors.

According to some aspects of the inventive concepts, there is provided a vision sensor including a pixel array including a plurality of pixels arranged in a matrix form, an event detection circuit configured to detect whether an event has occurred in each of the plurality of pixels during a first sampling time and generate a plurality of pieces of first event data respectively corresponding to pixels in which the event has occurred, and a processor configured to receive the plurality of pieces of first event data and generate a motion signal based on the plurality of pieces of first event data and reference data.

According to some aspects of the inventive concepts, there is provided an operating method of a vision sensor including a pixel array including a plurality of pixels including generating a plurality of pieces of event data respectively corresponding to the pixels in which an event has occurred among the plurality of pixels, generating first probability data based on the plurality of pieces of event data based on an event occurred during a first sampling time, generating comparison data based on a difference between the first probability data and reference data by comparing the first probability data with the reference data, determining whether to update a motion count value by comparing the comparison data with a first threshold value, and generating a motion signal based on a result of comparing a final motion count value generated by determining whether to update the motion count value with a second threshold value.

According to some aspects of the inventive concepts, there is provided an image processing device including a vision sensor configured to generate a plurality of pieces of event data respectively corresponding to pixels in which an event has occurred among a plurality of pixels, and a processor configured to determine whether the object moves based on the plurality of pieces of event data, wherein the vision sensor includes a pixel array including the plurality of pixels, and an event detection circuit configured to detect whether the event has occurred in each of the plurality of pixels and generate the plurality of pieces of event data respectively corresponding to the pixels in which the event has occurred, and the processor is configured to generate first probability data based on event data received during a first sampling time, generate second probability data based on event data received during a second sampling time temporally successive to the first sampling time, by using a probability calculation model, generate a final motion count value based on the first probability data and the second probability data, and determine whether an object moves by comparing the final motion count value with a second threshold value.

According to some aspects of the inventive concepts, there is provided a vision sensor operating in a monitoring mode including a pixel array including a plurality of pixels arranged in a matrix form, an event detection circuit configured to detect whether an event has occurred in each of the plurality of pixels during a first sampling time and generate a plurality of pieces of first event data based on pixels in which the event has occurred, and a processor configured to receive the plurality of pieces of first event data and generate a motion signal based on the plurality of pieces of first event data and reference data, wherein the processor is configured to convert an operation mode of the vision sensor from the monitoring mode to an active mode based on the motion signal.

According to some aspects of the inventive concepts, there is provided an image processing device including the vision sensor.

According to some aspects of the inventive concepts, there is provided an image processing device for photographing an object in a monitoring mode including a vision sensor configured to generate a plurality of pieces of event data respectively corresponding to pixels in which an event has occurred among a plurality of pixels, and a processor configured to determine whether the object moves based on the plurality of pieces of event data, wherein the processor is configured to generate first probability data based on event data received during a first sampling time, by using a probability calculation model, generate a motion signal based on a result of comparing the first probability data with reference data, and convert an operation mode of the image processing device from the monitoring mode to an active mode based on the motion signal.

BRIEF DESCRIPTION OF THE DRAWINGS

Example embodiments will be more clearly understood from the following detailed description taken in conjunction with the accompanying drawings in which:

FIG. 3 is a block diagram illustrating a pixel according to some example embodiments;

FIG. 5 illustrates a pixel array according to some example embodiments;

FIG. 10 is a flowchart illustrating an operating method of a vision sensor according to some example embodiments;

FIG. 11 is a flowchart illustrating an operating method of a vision sensor according to some example embodiments;

DETAILED DESCRIPTION

Figure 1:
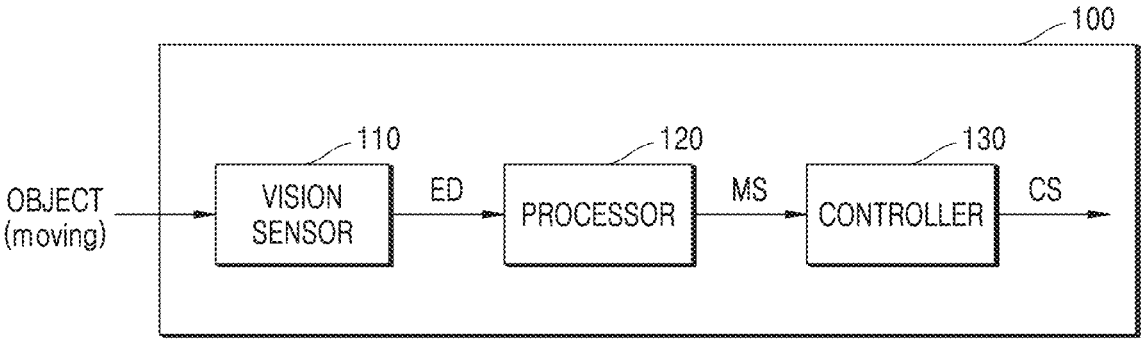
FIG. 1 is a block diagram illustrating an image processing device according to some example embodiments.

FIG. 1 is a block diagram illustrating an image processing device according to some example embodiments.

An image processing device 100 according to some example embodiments may be loaded in an electronic device having an image or light sensing function. For example, the image processing device 100 may be loaded in an electronic device such as a camera, s smartphone, a wearable device, an Internet of Things (IoT) device, a tablet personal computer (PC), a personal digital assistant (PDA), a portable multimedia player (PMP), a navigation device, a drone, an advanced drivers assistance system (ADAS), etc. Also, the image processing device 100 may be provided as a component in a vehicle, furniture, manufacturing equipment, doors, various measuring devices, etc.

Referring to FIG. 1A, the image processing device 100 may include a vision sensor 110, a processor 120, and a controller 130. The vision sensor 110 may detect a change in intensity of incident light, generate event data ED, and transmit the event data ED to the processor 120.

The vision sensor 110 may be a dynamic vision sensor that outputs the event data ED corresponding to pixels in which the change in intensity of light is detected, for example, pixels in which an event has occurred. The change in light intensity may be caused by movement of an object photographed by the vision sensor 110, movement of the vision sensor 110 or the image processing device 10 itself, or an environmental factor (e.g., when a snowy or rainy environment is photographed). An occurrence of an event due to the movement of the vision sensor 110 or the image processing device 100 or the environmental factor may correspond to noise. In some example embodiments, an unnecessary operation may not be performed on an event against noise by determining whether the event occurred according to the change in light intensity is the noise, and thus, unnecessary power consumption may be prevented or reduced. For example, according to some example embodiments, there may be an increase in accuracy of motion detection, power consumption, and noise removal based on the above methods. Therefore, the improved devices and methods overcome the deficiencies of the conventional devices and methods to motion detection and noise removal while reducing resource consumption and increasing data clarity. For example, by using the disclosed methods, the vision sensor 110 may require fewer resources, such as memory access and/or power to drive circuitry to produce a determination of an event occurring. Furthermore, the vision sensor 110 according to example embodiments may have improved resource usage as discussed above during improved detection of movement in a specific environment, such as a snowy or rainy environment.

The vision sensor 1100 may periodically or aperiodically transmit the event data ED to the processor 120. The vision sensor 110 may transmit the event data ED to the processor 120 in units of packets or frames. The event data ED may include position information of a corresponding pixel and/or time information when an event has occurred in the corresponding pixel.

The vision sensor 110 may selectively transmit the event data ED to the processor 120. The vision sensor 110 may transmit the event data ED generated from pixels corresponding to a region of interest set on a pixel array among the event data ED generated to correspond to pixels included in the pixel array to the processor 120. However, the inventive concepts are not limited thereto, and the vision sensor 110 may transmit the event data ED generated to correspond to all the pixels included in the pixel array to the processor 120.

The processor 120 may process the event data ED received from the vision sensor 110, and may detect movement of an object (or movement of an object on an image recognized by the image processing device 100). The processor 120 may include an application specific integrated circuit (ASIC), a field-programmable gate array (FPGA), a dedicated microprocessor, a microprocessor, a general-purpose processor, etc. In some example embodiments, the processor 120 may include an application processor or an image signal processor. In FIG. 1, for description of the processor 120, the processor 120 is expressed as not included in the vision sensor 110, but the processor 120 according to the inventive concepts may be included in the vision sensor 110.

The processor 120 according to the inventive concepts may determine whether an object is moving by comparing the event data ED generated during a sampling time with a preset (or, alternatively, desired or determined) threshold value or the event data ED generated during a previous sampling time. Here, the movement of the object means an event that does not correspond to noise.

The sampling time of the inventive concepts are a term used to refer to a plurality of pieces of event data generated at different times as one unit temporally. For example, the sampling time may be a time corresponding to b times (b being an integer greater than or equal to 1) of a frame period. The sampling time may be set differently according to an environment photographed by the vision sensor 110 or user's settings.

The processor 120 according to the inventive concepts may generate a motion signal MS by determining whether a motion condition is satisfied based on the received event data ED. The vision sensor 110 may operate in a monitoring mode or an active mode based on the motion signal MS. The monitoring mode may include a first monitoring mode and a second monitoring mode, and the first monitoring mode may be distinguished from the second monitoring mode according to whether an event has continuously occurred (e.g., when a rainy or snowy environment is photographed). The motion condition, a motion signal, the monitoring mode, and the active mode are described in detail below.

Meanwhile, each of the vision sensor 110 and the processor 120 may be implemented as an integrated circuit (IC). For example, the vision sensor 110 and the processor 120 may be implemented as separate semiconductor chips. Alternatively, the vision sensor 110 and the processor 120 may be implemented as a single chip. For example, the vision sensor 110 and the processor 120 may be implemented as a system on chip (SoC).

The controller 130 may receive the motion signal MS generated by the processor 120 and output a control signal CS. The image processing device 100 may operate in the monitoring mode or the active mode based on the control signal CS. For example, other components (not shown, intellectual properties (IPs) of FIGS. 4A and 4B to be described below) included in the image processing device 100 may operate in the monitoring mode or the active mode based on the control signal CS. For example, the controller 130 may receive the motion signal MS to generate the control signal CS, and based on the control signal CS, supply power to other components (not shown). On the other hand, when the controller 130 does not generate the control signal CS, power may be cut off in other components (not shown). A mode in which power is supplied to other components (not shown) based on the control signal CS may be referred to as the active mode, and a mode in which power is cut off may be referred to as the monitoring mode. Operations of the image processing device 100 in the monitoring mode and the active mode according to the inventive concepts are not limited to the above examples, and may include various methods of managing power consumption. This is described below with reference to FIGS. 4A to 4C.

The control signal CS according to the inventive concepts does not refer to a specific signal generated by the controller 130 but to a signal generated by the controller 130 to control operations of various components while the image processing device 100 operates in the monitoring mode or the active mode. For example, in the active mode, a signal generated by the controller 130 to supply power to all pixels included in the vision sensor 110 and a signal provided by the controller 130 to provide a clock signal to various components may be collectively referred to as the control signal CS. This is described below with reference to FIGS. 4A to 4C.

Figure 2:
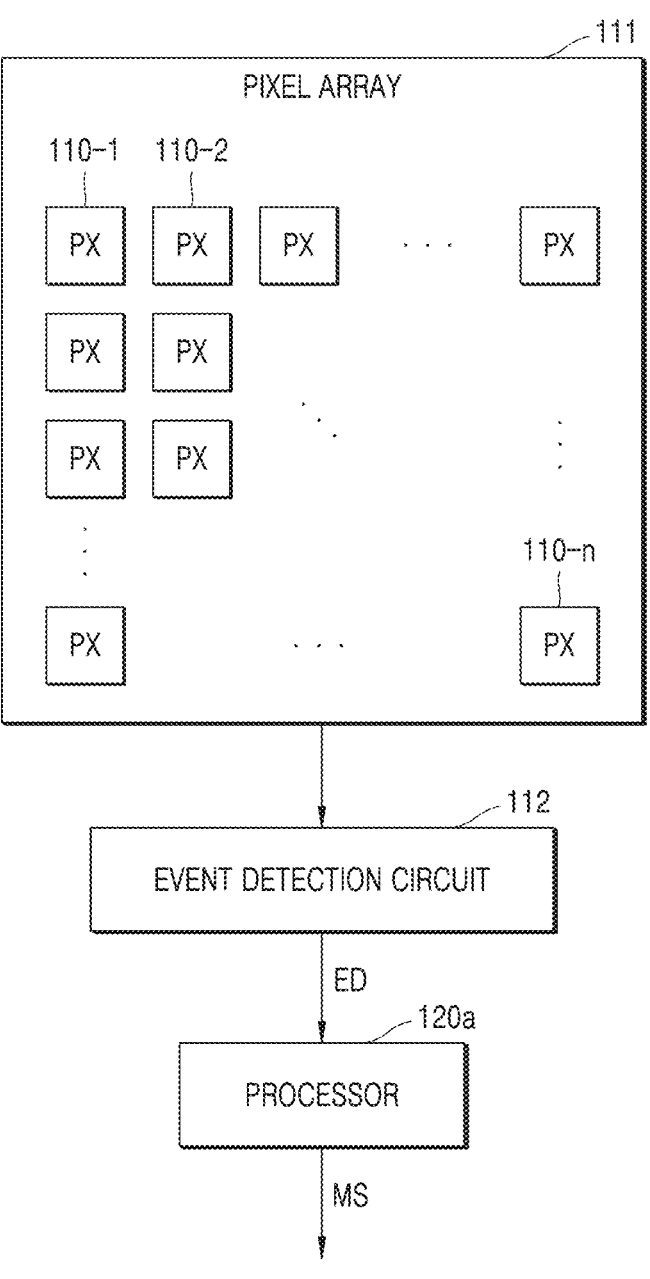
FIG. 2 is a block diagram illustrating a vision sensor according to some example embodiments.

FIG. 2 is a block diagram illustrating a vision sensor according to some example embodiments.

FIG. 2 is the block diagram illustrating the vision sensor 110 of FIG. 1.

Referring to FIGS. 1 and 2, the vision sensor 110 may include a pixel array 111, an event detection circuit 112 and a processor 120a. The processor 120a may be the processor 120 of FIG. 1, and redundant descriptions thereof are omitted.

The pixel array 111 may include a plurality of pixels PX (e.g., 110-1 to 110-n) arranged in a matrix form. Each of the pixels PX may detect events in which the intensity of received light increases or decreases. For example, each of the pixels PX may be connected to the event detection circuit 112 through a column line (not shown) extending in a column direction and a row line (not shown) extending in a row direction. A signal indicating that an event has occurred and polarity information of the event (that is, whether the event is an on event in which the intensity of light increases or an off event in which the intensity of light decreases, hereinafter referred to as event) may be output from the pixel PX in which the event has occurred to the event detection circuit 112.

The event detection circuit 112 may read events from the pixel array 111 and process the events. The event detection circuit 112 may generate the event data ED including polarity information of the event that occurred, an address of the pixel in which the event has occurred, and time information about when the event has occurred. The event detection circuit 112 may process the events occurred in the pixel array 111 in units of pixels, units of pixel groups including a plurality of pixels (e.g., pixels included in a sub region described below), units of columns, or units of frames.

The event detection circuit 112 may include a column scanner circuit, a row event readout circuit, an event signal processor (ESP), and a bias generator.

The column scanner circuit of the event detection circuit 112 may scan the pixels PX included in the pixel array 111 in units of columns. For example, the column scanner circuit may transmit a selection signal to a column to be scanned, among a plurality of columns of the pixel array 111, to scan the pixels PX included in the column to be scanned.

The pixels PX included in the column to be scanned may transmit, to the row event readout circuit, polarity information indicating whether an event in which the intensity of light increases or decreases in response to the selection signal occurs.

The row event readout circuit of the event detection circuit 112 may receive the polarity information from the pixels PX included in the column to be scanned. The row event readout circuit may transmit a reset signal to the pixel PX in which the event (e.g., the on event or the off event) occurred in response to the polarity information. The pixel PX in which the event occurred may be reset in response to the reset signal.

The vision sensor 110 according to the inventive concepts may further include an interface circuit (not shown) between the event detection circuit 112 and the processor 120a. The interface circuit (not shown) may receive the event data ED and transmit the event data ED to the processor 120a according to a set protocol. The interface circuit (not shown) may pack the event data ED and the time information in individual signal units, packet units, or frame units according to a set protocol, and may transmit the event data ED to the processor 120a. For example, the interface circuit (not shown) may include one of an address event representation (AER) interface, a mobile industry processor interface (MIPI) interface, and a parallel interface.

The vision sensor 110 according to some example embodiments may generate the event data ED based on an event occurred during a sampling time, and provide the event data ED in a unit respectively corresponding to a plurality of sub regions described below with reference to FIG. 5 to the processor 120a. For example, referring to FIG. 5, the processor 120a may receive the event data ED corresponding to a first sub region SR1 and the event data ED corresponding to a second sub region SR2, among the event data ED generated based on the event occurred during the sampling time. The processor 120a may determine whether a motion condition is satisfied based on the received event data ED, and when the motion condition is satisfied, generate the motion signal MS and output the motion signal MS to the controller 130 of FIG. 1.

Figure 3:
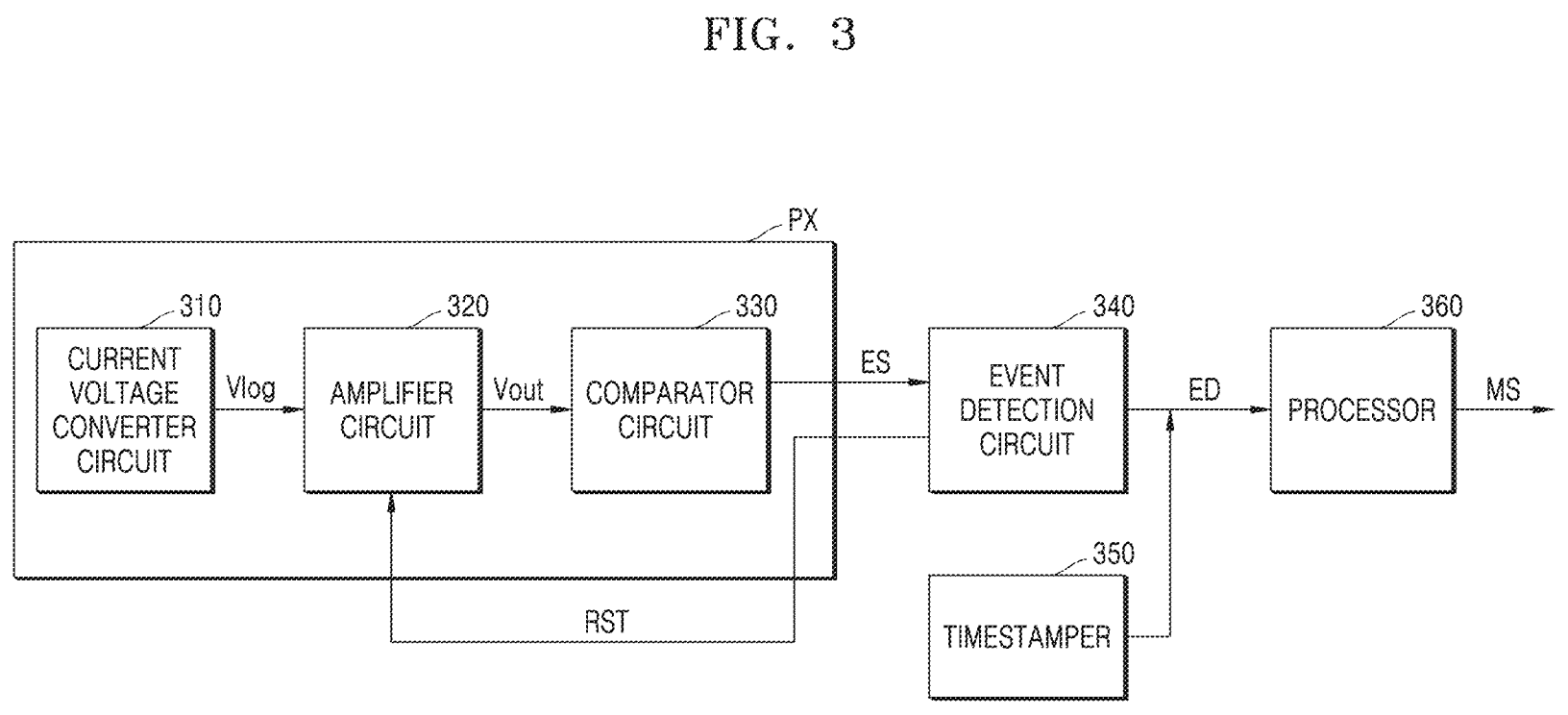

FIG. 3 is a block diagram illustrating a pixel according to some example embodiments.

Referring to FIG. 3, the pixel PX may include a current voltage converter circuit 310 including a photoelectric conversion device, an amplifier circuit 320, and a comparator circuit 330. The pixel PX of FIG. 3 may be included in the pixel array 111 of FIG. 2.

The current voltage converter circuit 310 may include the photoelectric conversion device. The photoelectric conversion device may convert incident light, for example, an optical signal, into an electrical signal, for example, a current. The photoelectric conversion device may include, for example, a photodiode, a phototransistor, a photo gate, or a pinned photodiode. The photoelectric conversion device may generate an electrical signal having a higher level as the intensity of incident light increases.

The current voltage converter circuit 310 may include a logarithmic amplifier. The logarithmic amplifier may convert the current generated by the photoelectric conversion device into a voltage and amplify a voltage level of the voltage to generate a log voltage Vlog in a log scale. The current voltage converter circuit 310 may include a feedback transistor.

The amplifier circuit 320 may receive the log voltage Vlog from the current voltage converter circuit 310, amplify the log voltage Vlog to generate an output voltage Vout. The amplifier circuit 320 may include capacitors (for example, a first capacitor and a second capacitor), a differentiator amplifier, and a switch. The first capacitor and the second capacitor may store charges corresponding to an output generated by the photoelectric conversion device. The differentiator amplifier may amplify the amount of change in the log voltage Vlog during a certain period of time to generate the output voltage Vout, and a feedback circuit may be connected between an input terminal and an output terminal of the differentiator amplifier.

Additionally, the pixel PX may further include a source-follower in the amplifier circuit 320. The source follower may prevent or reduce kick-back noise from the amplifier circuit 320 to the current voltage converter circuit 310.

The switch may be located on the feedback circuit and turned on or off based on a reset signal RST. The switch may be turned on in response to the reset signal RST in which an event signal (e.g., an on event signal or an off event signal) is generated.

For example, when the switch is turned on, the output voltage Vout may be reset as voltages at both ends of the differentiator amplifier become the same. That is, the differentiator amplifier may generate the output voltage Vout by amplifying the amount of change in the log voltage Vlog of an event that occurs next time from when the output voltage Vout is reset according to the reset signal RST.

The comparator circuit 330 may generate an event signal ES indicating that an event occurred when the amount of change in light incident on the photoelectric conversion device is greater than or equal to a certain change level. For example, the comparator circuit 330 may compare the output voltage Vout of the amplifier circuit 320 with a threshold voltage, and generate the event signal ES having active levels according to a comparison result.

The event detection circuit 340 may receive the event signal ES from the pixel PX, and generate event information about a type (for example, the polarity of an on event or an off event) of an event has occurred in the pixel PX, and address information that is position information of the pixel PX in which the event has occurred. When an on event or an off event is detected, the event detection circuit 340 may generate the reset signal RST and provide the reset signal RST to the specific pixel PX in which the on event or the off event has occurred.

As described above, the processor 360 may receive the event data ED. The event data ED may include the event information and the address information generated by the event detection circuit 340, and may further include time information about an event generation time generated by a time stamper 350.

The event detection circuit 340 according to the inventive concepts may generate the event data ED based on an event corresponding to pixels in which a change in light is detected during a sampling time, and the processor 360 may receive the event data ED and determine whether a motion condition is satisfied based on the event data ED. The processor 360 may determine whether the motion condition is satisfied based on the event data ED, and generate the motion signal MS when the motion condition is satisfied. An image processing device or a vision sensor may convert an operation mode from a monitoring mode to an active mode based on the motion signal MS.

The monitoring mode means a mode in which less power is consumed than in the active mode. For example, the image processing device or the vision sensor may perform a readout operation on all pixels included in a pixel array when operating in the active mode, but may read out the pixels in a binning method such as 2X2, 3X3, 4X4, etc. in the monitoring mode. Accordingly, the image processing device or the vision sensor may consume less power when operating in the monitoring mode than when operating in the active mode. In addition to the above example, power consumed by the image processing device or the vision sensor in the monitoring mode may be less than power consumed in the active mode by various methods such as operating a clock signal at a lower frequency in the monitoring mode than in the active mode. In this regard, operations of the vision sensor or the image processing device in the monitoring mode and the active mode according to the inventive concepts are described below with reference to FIGS. 4A to 4C.

The event data ED according to the inventive concepts are not generated only by the above configuration, and the event data ED according to some example embodiments may be generated through an AER generator. For example, in some example embodiments, a pixel may include an analog digital converter (ADC) circuit, and the ADC circuit may convert an analog signal generated by a photoelectric conversion device PD into a digital signal. The digital signal may mean a value obtained by digitizing the amount of change in light intensity. The AER generator may receive the digital signal and generate event data including event information, address information, and time information.

Figure 4A:
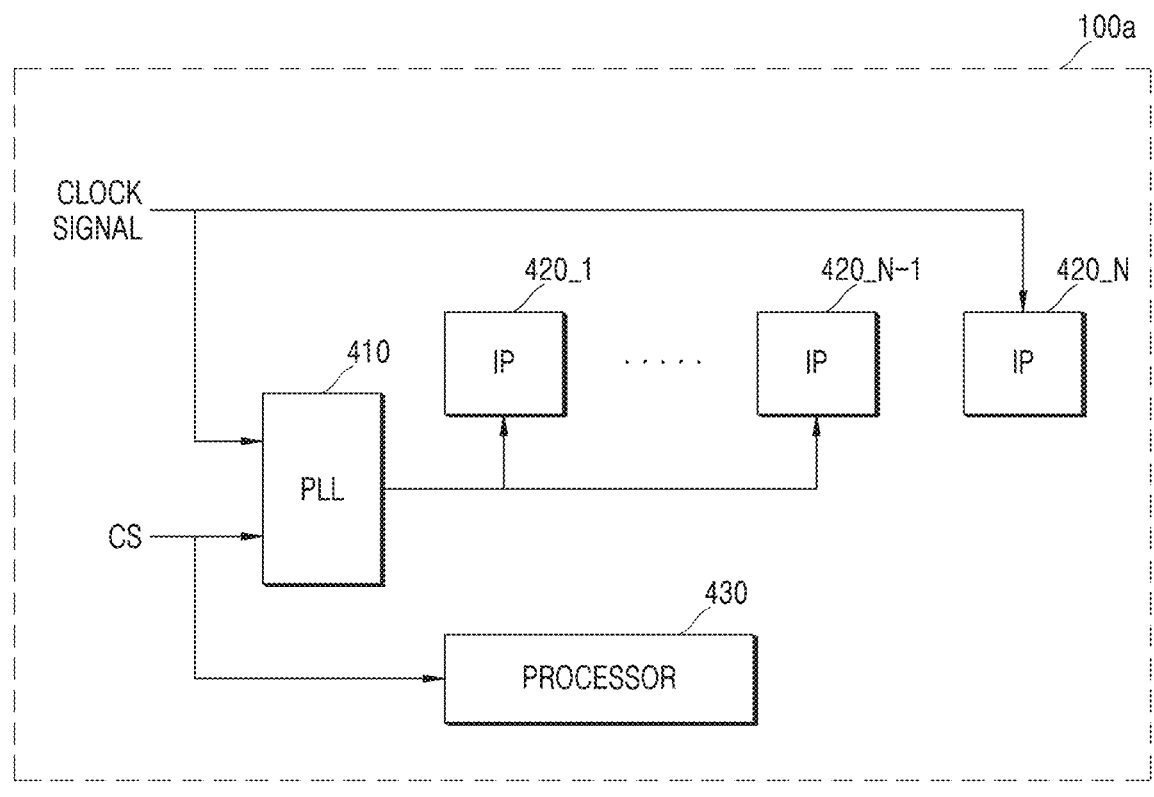
FIGS. 4A, 4B, and 4C are diagrams for explaining operations of an image processing device in a monitoring mode and an active mode according to some example embodiments.
Figure 4B:
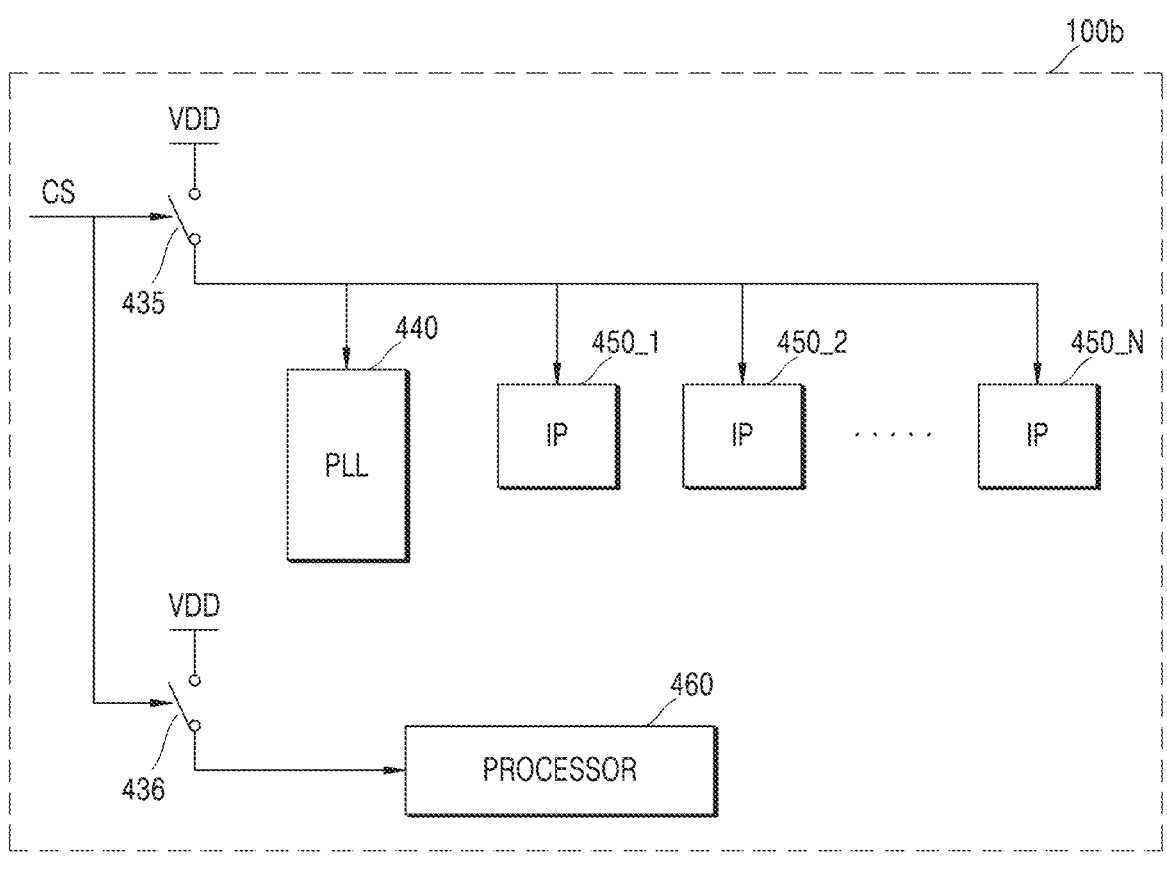
Figure 4C:
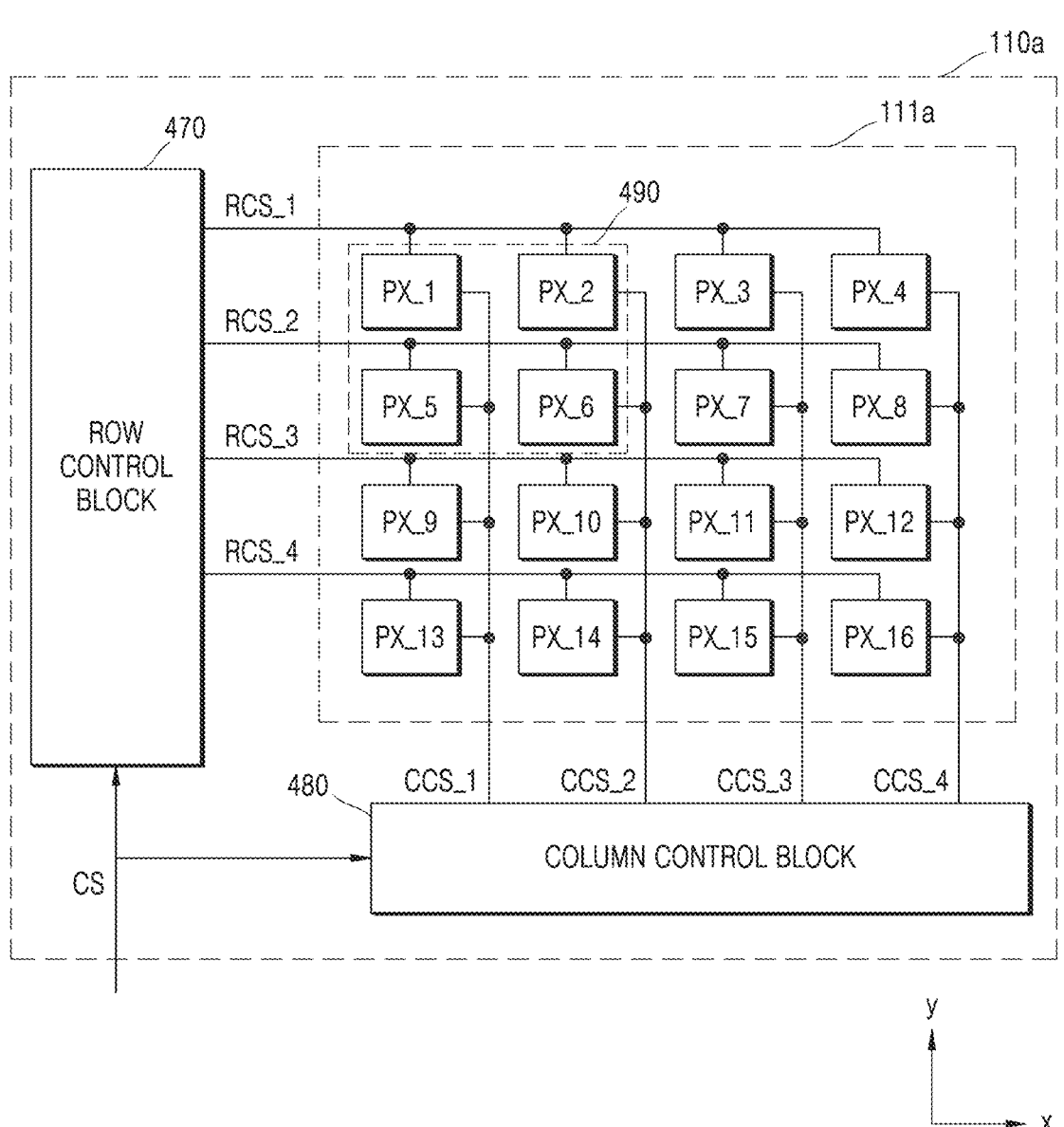

FIGS. 4A, 4B, and 4C are diagrams for explaining operations of an image processing device in a monitoring mode and an active mode according to some example embodiments.

Each of an image processing device 100a of FIG. 4A and an image processing device 100b of FIG. 4B may correspond to the image processing device 100 of FIG. 1, and a vision sensor 110a of FIG. 4C may correspond to the vision sensor 110 of FIG. 1. Therefore, redundant descriptions thereof may be omitted.

The image processing device 100 of FIG. 1 or the vision sensor 110 of FIG. 1 according to the inventive concepts may operate in a sleep mode, a monitoring mode, or an active mode. For example, the image processing device 100 of FIG. 1 may convert a mode from the sleep mode to the monitoring mode, and may convert the mode from the monitoring mode to the active mode. Here, the sleep mode refers to a mode in which the image processing device 100 of FIG. 1 does not operate. For example, the sleep mode may mean a mode in which little or no power is consumed. The image processing device 100 of FIG. 1 may convert the mode to the monitoring mode in which less power is consumed than in the active mode without directly converting the mode from the sleep mode to the active mode. For example, the image processing device 100 of FIG. 1 may convert the mode from the sleep mode to the monitoring mode for motion recognition, and when detecting a motion that satisfies a condition or previously determined condition, convert an operation mode from the monitoring mode to the active mode for motion recognition. In the present specification, 'mode' and 'operation mode' are used to refer to an operation state of the image processing device 100 of FIG. 1 and are not distinguished from each other. As described above, because the monitoring mode refers to a mode in which less power is consumed than in the active mode, when the image processing device 100 of FIG. 1 converts the mode to the active mode through the monitoring mode for motion recognition, less power may be consumed than when directly converting from the sleep mode to the active mode.

As described above, the control signal CS according to the inventive concepts does not refer to a specific signal generated by the controller 130 of FIG. 1, and may mean a signal generated by the controller 130 of FIG. 1 to control operations of various components while the image processing device 100 of FIG. 1 operates in the monitoring mode or the active mode.

In the description with reference to FIGS. 4A to 4C to be given below, the image processing device 100 of FIG. 1 is described to operate in the monitoring mode and the active mode through the control signal CS generated by the controller 130 of FIG. 1 based on the motion signal MS, but the image processing device 100 of FIG. 1 according to the inventive concepts are not limited thereto, and may operate in the monitoring mode and the active mode similarly to an operation described below based on the motion signal MS generated by the processor 120 of FIG. 1.

Referring to FIG. 4A, the image processing device 100*a* according to the inventive concepts may include a phase-looked loop (PLL) 410, a plurality of Ips 420_1 to 420_N, and a processor 430. The processor 430 may correspond to the processor 120 of FIG. 1, and redundant descriptions thereof are omitted.

As described above, the image processing device 100*a* may operate in the sleep mode and may convert an operation mode to the monitoring mode for motion detection. For example, based on a user's input and/or a specific condition, the image processing device 100*a* may convert the operation mode from the sleep mode to the monitoring mode. The image processing device 100*a* may further include the controller 130 of FIG. 1, and the processor 430 may determine whether a motion condition is satisfied in the monitoring mode based on event data. The processor 430 may not generate a motion signal when the motion condition is not satisfied, and may output the motion signal to the controller 130 of FIG. 1 when the motion condition is satisfied. The controller 130 of FIG. 1 may output the control signal CS when receiving the motion signal.

Referring to FIG. 4A, the PPL 410 may receive a clock signal generated by a clock generator (not shown) and the control signal CS generated by the controller 130 of FIG. 1. The PPL 410 may be turned on by receiving the control signal CS. The PPL 410 may adjust the received clock signal to a signal having a constant frequency based on a reference frequency, and output the adjusted clock signal to the plurality of Ips 420_1 to 420_N-1. The plurality of Ips 420_1 to 420_N may mean logic circuit blocks included in the image processing device 100*a*. For example, a MIPI interface, an application processor (AP), etc. may correspond to Ips.

Referring to FIG. 4A, the controller 130 of FIG. 1 may not generate the control signal CS when the motion signal is not generated, that is, when the motion condition is not satisfied. In this case, the image processing device 100*a* may continuously operate in the monitoring mode. Because the control signal CS is not generated in the monitoring mode, the PPL 410 included in the image processing device 100*a* may be turned off. When the PPL 410 is turned off, because the clock signal is not output to the plurality of Ips 420_1 to 420_N-1, the plurality of Ips 420_1 to 420_N-1 may be turned off. For example, the Ips 410_1 to 420_N-1 turned off in the monitoring mode may be logic circuit blocks used to process information about object movement detected by a vision sensor. In the monitoring mode, processing the information about the object movement may not be performed by the plurality of Ips 410_1 to 410_N-1, and thus, the image processing device 100*a* may turn on the plurality of Ips 410_1 to 420_N-1 to reduce power consumption. Here, processing the information about the object movement may refer to processing the event data ED of FIG. 1 performed by an AP for motion recognition based on the event data ED of FIG. 1.

Some Ips (e.g., 420_N) among the plurality of Ips 420_1 to 420_N may be turned on even in the monitoring mode. For example, the IP 420_N may be an interface (not shown) located between the vision sensor 110 of FIG. 1 and the processor 120 of FIG. 1.

Referring to FIG. 4A, the controller 130 of FIG. 1 may generate the control signal CS when the motion signal is generated, that is, when the motion condition is satisfied. Accordingly, the image processing device 100*a* may convert the operation mode from the monitoring mode to the active mode based on the motion signal (or based on the control signal CS). In the active mode, the PPL 410 included in the image processing device 100*a* may be turned on by receiving the control signal CS. When the PPL 410 is turned on, the PPL 410 may output the received clock signal to the plurality of Ips 420_1 to 420_N-1. The plurality of Ips 420_1 to 420_N-1 that received the clock signal may perform an operation of processing the information about object movement.

In the active mode, the processor 430 may be turned off based on the control signal CS, and may omit determining whether the motion condition is satisfied. However, the inventive concepts are not limited thereto, and the processor 430 may continuously determine whether the motion condition is satisfied based on newly generated event data regardless of the control signal CS even in the active mode.

As described above, the image processing device 100*a* may reduce power consumption by converting the mode to the active mode through the monitoring mode without directly converting the mode from the sleep mode to the active mode.

An operating method of the image processing device 100*a* in the monitoring mode and the active mode described with reference to FIG. 4A may be referred to as a clock management. The operation of the image processing device 100*a* described above is an example, and the clock management according to the inventive concepts are not limited thereto, and may include various methods of changing whether the clock signal is applied to at least one IP included in the image processing device 100a based on whether the motion signal is generated.

Referring to FIG. 4B, the image processing device 100b according to the inventive concepts may include a first switch 435, a PPL 440, and a plurality of Ips 450_1 to 450_N, and a processor 460. The processor 460 may correspond to the processor 120 of FIG. 1, and the PPL 440 and the plurality of Ips 450_1 to 450_N may respectively correspond to the PPL 410 and the plurality of Ips 420_1 to 420_N of FIG. 4A, and thus, redundant descriptions thereof are omitted. The image processing device 100b may further include a second switch 436 connected between the processor 460 and a power voltage VDD.

As described above, the controller 130 of FIG. 1 may not generate the control signal CS when the motion signal is not generated, that is, when the motion condition is not satisfied. In this case, the image processing device 100b may operate in the monitoring mode. On the other hand, the controller 130 of FIG. 1 may generate the control signal CS when the motion signal is generated, that is, when the motion condition is satisfied. In this case, the image processing device 100b may operate in the active mode.

The first switch 435 and the second switch 436 may be turned on in response to the control signal CS generated by the controller 130 of FIG. 1. On the other hand, the first switch 435 and the second switch 436 may be turned off when the control signal CS is not generated.

Referring to FIG. 4B, when the motion condition is not satisfied, because the image processing device 100b operates in the monitoring mode, and the control signal CS is not generated, the first switch 435 may be turned off. When the first switch 435 is turned off, because the power voltage VDD is not applied to the PPL 440 and the plurality of Ips 450_1 to 450_N, the PPL 440 and the plurality of Ips 450_1 to 450_N may be turned off. Accordingly, in the monitoring mode, the image processing device 100b may consume less power than in the active mode.

As described above, because processing the information processing about object movement is not performed in the monitoring mode, the plurality of Ips 450_1 to 450_N may be turned off, and the image processing device 100b may consume less power than when operating in the active mode.

The image processing device 100b may operate in the active mode when the motion condition is satisfied, and in the active mode, the first switch 435 may be turned on in response to the control signal CS generated by the controller 130 of FIG. 1 based on the motion signal. As the first switch 435 is turned on, the power supply voltage VDD may be applied to the PPL 440 and the plurality of Ips 450_1 to 450_N. Accordingly, in the active mode, the image processing device 100b may perform processing on the information about object movement.

As described above, the image processing device 100b may reduce power consumption by converting the mode to the active mode through the monitoring mode without directly converting the mode from the sleep mode to the active mode.

An operating method of the image processing device 100b in the monitoring mode and the active mode described with reference to FIG. 4B may be referred to as a power management. The operation of the image processing device 100b described above is an example, and the power management according to the inventive concepts are not limited thereto, and may include various methods of changing whether the power voltage VDD is applied to at least one IP included in the image processing device 100b based on whether the motion signal is generated.

Referring to FIG. 4C, the vision sensor 110a according to the inventive concepts may include a pixel array 111a, a row control block 470, and a column control block 480. The pixel array 111a may include a plurality of pixels PX_1 to PX_16. The pixel array 111a may correspond to the pixel array 111 of FIG. 2, and thus, redundant descriptions thereof are omitted.

The pixel array 111a may include the 4×4 pixels PX_1 to PX_16. This is for convenience of description, and the number of pixels included in the pixel array 111a according to the inventive concepts are not limited to 4×4. Each of the pixels PX_1 to PX_16 included in the pixel array 111a corresponds to the pixel PX included in the pixel array 111 described with reference to FIG. 2, and thus, redundant descriptions thereof are omitted.

The row control block 470 may output row control signals RCS_1 to RCS_4 to the plurality of pixels PX_1 to PX_16 included in the pixel array 111a through row control lines extending in a first direction (x direction), and the control block 480 may output column control signals CCS_1 to CCS_4 to the plurality of pixels PX_1 to PX_16 included in the pixel array 111a through column control lines extending in a second direction (y direction). The row control block 470 and the column control block 480 may operate based on the control signal CS generated by the controller 130 of FIG. 1. For example, the row control block 470 and the column control block 480 may respectively output the row control signal RCS_2 and the column control signal CCS_2 to the pixel PX_6 based on the control signal CS.

Each of the plurality of pixels PX_1 to PX_16 included in the pixel array 111a may output an event in response to the row control signals RCS_1 to RCS_4 output from the row control block 470 and the column control signals CCS_1 to CCS_4 output from the column control block 480. For example, among the pixels PX_1 to PX_16 included in the pixel array 111a, the pixel PX_6 receiving the row control signal RCS_2 and the column control signal CCS_2 may output an event, and the other pixels PX_1 to PX_5 and PX_7 to PX_16 may not output an event. Therefore, the vision sensor 110a may output the event occurred from some of the pixels PX_1 to PX_16 included in the pixel array 111a based on the control signal CS generated by the controller 130 of FIG. 1. The vision sensor 110a and an image processing device including the vision sensor 110a may not output all events generated from the pixels PX_1 to PX_16 in a monitoring mode, but only output events generated from some pixels, thereby reducing power consumption.

Referring to FIG. 4C, as described above, the vision sensor 110a may output events generated from some of the plurality of pixels PX_1 to PX_16, but may output events generated from pixels 490 adjacently arranged in a 2×2 form as one event. Such an output method is referred to as binning. When the vision sensor 110a operates in a binning method, because the number of events processed by the processor 120 of FIG. 1 may be small, power consumption may be relatively small. Accordingly, the vision sensor 110a and the image processing device including the vision sensor 110a may operate in the binning method in the monitoring mode to reduce power consumption.

As described above, the vision sensor 110a and the image processing device including the vision sensor 110a may reduce power consumption by converting a mode to an active mode through the monitoring mode without directly converting the mode from a sleep mode to the active mode An operating method of the vision sensor 110a and the image processing device including the vision sensor 110a in the monitoring mode and the active mode described with reference to FIG. 4C may be referred to as a pixel management. The operation of the vision sensor 110a described above is an example, and the pixel management according to the inventive concepts are not limited to the above example, and may include various methods of outputting events from some pixels among all pixels included in the vision sensor 110a based on whether the motion signal is generated.

In addition to the operation of the image processing device described with reference to FIGS. 4A to 4C, power consumption in the monitoring mode may be reduced by blocking event data output from a vision sensor. For example, referring to FIG. 1, the vision sensor 110 may output the event data ED of FIG. 1 to an AP (not shown) included in the image processing device 100 in addition to the processor 120 in order to recognize an operation. The AP may receive the event data ED of FIG. 1 and process an event based on the event data ED of FIG. 1. When the vision sensor 110 operates in the monitoring mode according to the inventive concepts, because the AP does not perform processing on an event, the vision sensor 110 may not output the event data ED to the AP based on a control signal generated by the controller 130. Accordingly, power consumed by the vision sensor 110 for outputting the event data ED may be reduced. A method of managing power consumption through an event data output management according to the inventive concepts may be referred to as an output management, and the output management according to the inventive concepts are not limited to the above example, and may include various methods of changing whether the vision sensor outputs the event data ED according to the inventive concepts based on whether the motion signal is generated.

An image processing device according to the inventive concepts may operate in the monitoring mode and the active mode through each of the power management, the pixel management, and the output management described above or a combination thereof. For example, according to some example embodiments, there may be an increase in accuracy of motion detection, power consumption, and noise removal based on the above methods. Therefore, the improved devices and methods overcome the deficiencies of the conventional devices and methods to motion detection and noise removal while reducing resource consumption and increasing data clarity. For example, by using the disclosed methods, the vision sensor 110 may require fewer resources, such as memory access and/or power to drive circuitry to produce a determination of an event occurring.

Figure 5:
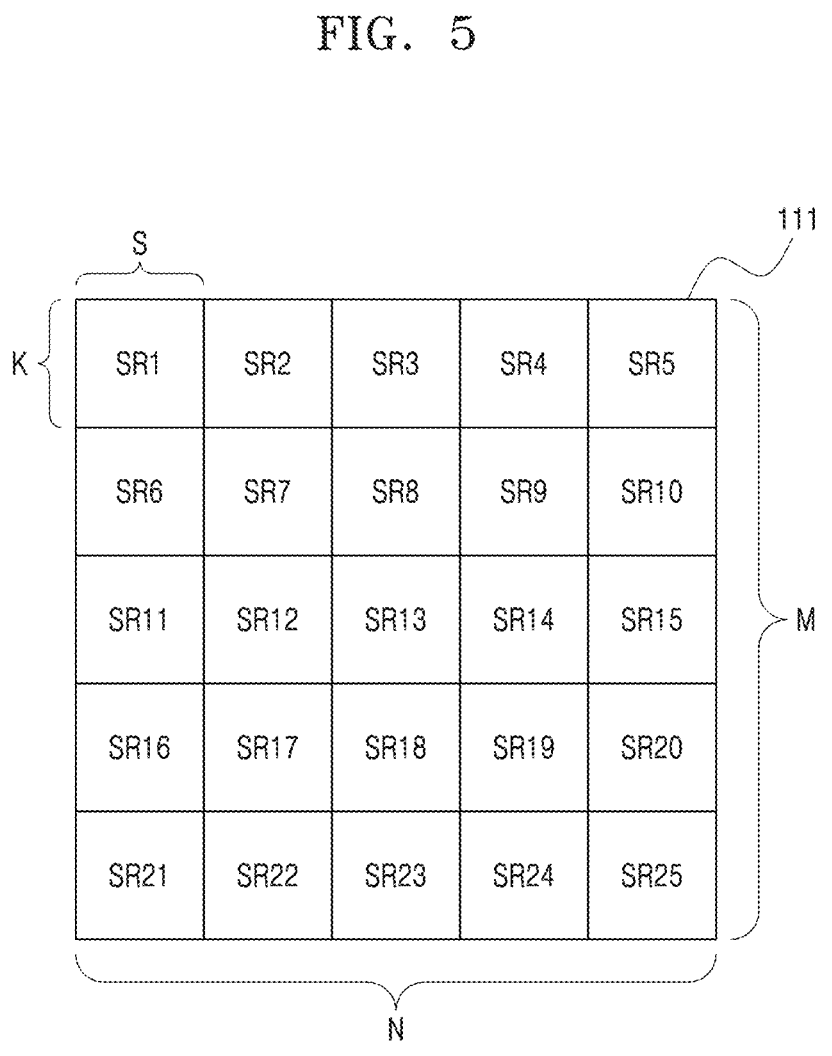

FIG. 5 illustrates a pixel array according to some example embodiments.

FIG. 5 is a diagram illustrating the pixel array 111 of FIG. 2 including a plurality of sub regions SR1 to SR25.

Referring to FIG. 5, the pixel array 111 may include a plurality of pixels arranged in the form of an M×N matrix, and one sub region (e.g., the first sub region SR1) may include a plurality of pixels arranged in the form of a K×S matrix. For example, the pixel array 111 may include M*N pixels and (M/K)*(N/S) sub regions, and each of the plurality of sub regions SR1 to SR25 included in the pixel array 111 may include K*S pixels. Each of M and N is an integer greater than 1, and each of K and S is an integer equal to or less than each of M and N and greater than or equal to 1. Accordingly, a sub region according to the inventive concepts may be a region including at least one pixel or may be the same as a pixel array region.

According to the inventive concepts, the event data ED corresponding to each of the plurality of sub regions SR1 to SR25 of FIG. 5 may be provided to the processor 120 of FIG. 1. For example, the event data ED generated based on an event occurred when a pixel included in the first sub region SR1 detects a change in light intensity may correspond to the first sub region SR1. Similarly, the event data ED generated based on an event occurred when a pixel included in the second sub region SR2 detects a change in light intensity may correspond to the second sub region SR2.

The processor 120 of FIG. 1 according to the inventive concepts may sequentially or simultaneously receive a plurality of pieces of event data ED respectively corresponding to the plurality of sub regions SR1 to SR25, and perform processing on the plurality of pieces of event data ED respectively corresponding to the plurality of sub regions SR1 to SR25. Here, processing may refer to an operation performed by the processor 120 of FIG. 1 to determine whether a motion condition is satisfied. For example, processing may include calculating a plurality of pieces of probability data respectively corresponding to the plurality of sub regions SR1 to SR25 by using a probability calculation model described below, comparing each of the plurality of pieces of probability data with preset (or, alternatively, desired or determined) reference data, etc.

The number of sub regions according to the inventive concepts are not limited to the number of sub regions of FIG. 5 and may be set differently according to a user's need or a photographing environment.

Figure 6A:
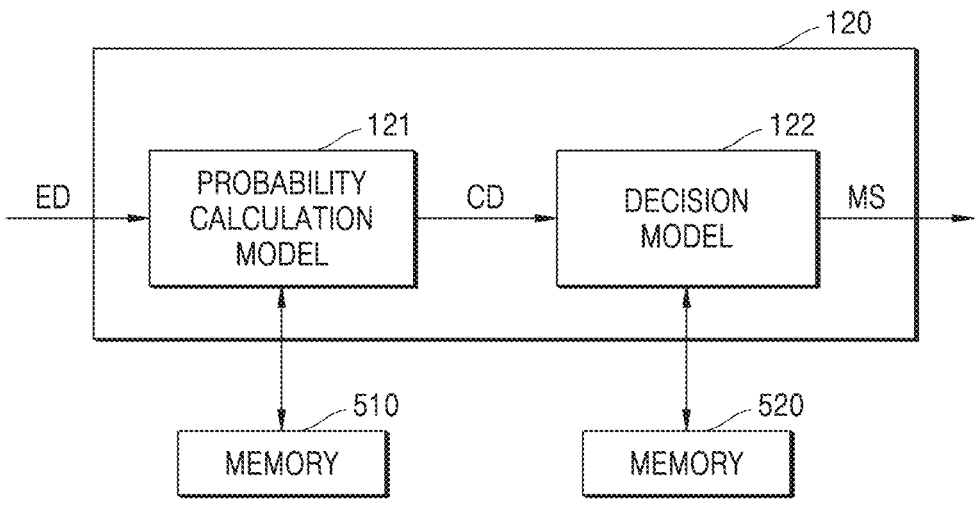
FIG. 6A is a block diagram illustrating a processor according to some example embodiments.
Figure 6B:
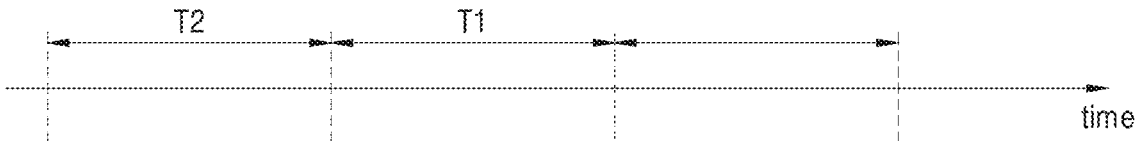
FIG. 6B is a timing diagram illustrating a sampling time according to some example embodiments.

FIG. 6A is a block diagram illustrating a processor according to some example embodiments. FIG. 6B is a timing diagram illustrating a sampling time according to some example embodiments.

Referring to the above description, the processor 120 may receive the event data ED from the event detection circuit 112 included in the vision sensor 110, and perform processing on the event data ED respectively corresponding to a plurality of sub regions each including at least one pixel.

The processor 120 may use a probability calculation model 121 to generate probability data based on the event data ED generated based on an event occurred during the sampling time, store the generated probability data in a memory 510, and retrieve the stored probability data from the memory 510. A plurality of pieces of probability data generated based on the plurality of pieces of event data ED respectively corresponding to the plurality of sub regions may be referred to as respectively corresponding to the plurality of sub regions.

A probability in the probability data of the inventive concepts means the degree that an event occurs, but is not limited to meaning a probability in mathematical meaning. For example, the processor 120 may generate the probability data by counting the number of events based on the event data ED corresponding to the first sub region SR1 of FIG. 3 by using the probability calculation model 121. Alternatively, the processor 120 may generate the probability data by dividing the first sub region SR1 into a plurality of regions and applying different weights to the plurality of regions. Alternatively, the processor 120 may generate the probability data by dividing the event data ED corresponding to the first sub region SR1 according to polarities. The probability calculation model 121 according to the inventive concepts are not limited to the above example, and may include all models that quantify the degree that an event occurs based on the event data ED generated during the sampling time.

The processor 120 according to the inventive concepts may generate the probability data by using the probability calculation model 121 and generate comparison data CD by comparing the probability data with preset (or, alternatively, desired or determined) reference data. The reference data may be probability data based on the event data ED corresponding to the same sub region received during a previous sampling time. In some example embodiments, the reference data may be a preset (or, alternatively, desired or determined) threshold value.

The reference data according to the inventive concepts may be determined according to an operation mode of the vision sensor 110 of FIG. 1 in a monitoring mode. The monitoring mode may include a first monitoring mode and a second monitoring mode, and the vision sensor 110 of FIG. 1 may operate in the first monitoring mode or the second monitoring mode. The reference data may be probability data based on the event data ED generated at a temporally preceding time in the first monitoring mode and may be a preset (or, alternatively, desired or determined) threshold value in the second monitoring mode. The second monitoring mode according to the inventive concepts are described in detail below with reference to FIG. 13.

Referring to FIGS. 6A and 6B, with respect to the first monitoring mode, the processor 120 may use the probability calculation model 121 to generate first probability data based on the event data ED corresponding to the first sub region SR1 of FIG. 3 received during a first sampling time T1, and generate the comparison data CD by comparing the first probability data with the reference data. In the first monitoring mode, the reference data may be second probability data. The second probability data means data received by the processor 120 during a second sampling time T2 temporally preceding the first sampling time T1 by using the probability calculation model 121, and generated based on the event data ED corresponding to the first sub region SR1 of FIG. 3. The processor 120 may generate the comparison data CD by comparing the first probability data and the second probability data corresponding to the same sub region. The comparison data CD may have a value corresponding to a difference between the first probability data and the second probability data, and therefore, the larger the difference between the first probability data and the second probability data, the greater the value of the comparison data CD. For example, the comparison data CD may be a value obtained by subtracting the second probability data (the reference data in the first monitoring mode) from the first probability data. Alternatively, the comparison data CD may be a ratio of the second probability data (the reference data in the first monitoring mode) to the first probability data. A large difference between the first probability data and the second probability data may mean a large difference between an event occurred during the first sampling time T1 and an event occurred during the second sampling time T2, and thus, the movement of an object during the first sampling time T1 may be relatively larger than the movement of the object during the second sampling time T2.

In the second monitoring mode according to the inventive concepts, the reference data may be a preset (or, alternatively, desired or determined) threshold value, and the comparison data CD in the second monitoring mode may be understood with reference to the above-described example.

According to the inventive concepts, the time of the first sampling time T1 may be the same as the time of the second sampling time T2, and the first sampling time T1 and the second sampling time T2 may be temporally continuous sampling times.

Referring to FIG. 6B, the second sampling time T2 is indicated as a time before the first sampling time T1 (for example, the first sampling time T1 is a sampling time following the second sampling time T2), but this is for distinguishing the first sampling time T1 from the second sampling time T2, and a second sampling time in the following description does not mean a sampling time temporally preceding a first sampling time. In the following description, another sampling time distinguished from the first sampling time may be referred to as the second sampling time. In other words, the first sampling time and the second sampling time are terms used to refer to different sampling times, a temporal precedence relationship between the first sampling time and the second sampling time is not determined by the term itself, and may vary depending on the description according to some example embodiments. For example, the temporal precedence relationship between the first sampling time and the second sampling time may be defined for each description with expressions such as temporally 'preceding', 'following', or 'continuous', which should be understood and applied in the same way as when the claims are interpreted.

The processor 120 according to the inventive concepts may use a decision model 122 to compare the comparison data CD corresponding to each of the plurality of sub regions (e.g., comparison data based on a result of comparing the first probability data with the second probability data corresponding to the same sub region in the first monitoring mode) with a preset (or, alternatively, desired or determined) first threshold value. The decision model 122 may update a motion count value based on a comparison result between the comparison data CD corresponding to each of the plurality of sub regions and the first threshold value. For example, referring to the above example, when a vision sensor operates in the first monitoring mode, the comparison data CD is the data based on the result of comparing the first probability data with the second probability data, and when the movement of the object is relatively large, the comparison data CD may have a value greater than the preset (or, alternatively, desired or determined) first threshold value. The processor 120 may increase (update) the motion count value when the comparison data CD is greater than the first threshold value. Conversely, when the comparison data CD is less than the first threshold value, the processor 120 may not update the motion count value. The first threshold value is a value that may be a reference for updating the motion count value, and may be, for example, a preset (or, alternatively, desired or determined) value or a value set by a user.

The processor 120 may use the decision model 122 to store the motion count value that is updated or not updated in a memory 520 and may retrieve the stored motion count values from the memory 520. For example, when the comparison data CD is equal to or greater than the first threshold value, the motion count value may be updated and the updated motion count value may be stored in the memory 520. Then, the processor 120 may retrieve the updated motion count value stored in the memory 520.

The processor 120 according to the inventive concepts may repeatedly perform an operation of comparing the above-described comparison data CD with the first threshold value with respect to a plurality of pieces of the comparison data CD respectively corresponding to the plurality of sub regions. For example, referring to FIG. 5, the processor 120 may use the probability calculation model 121 to generate probability data based on the event data ED corresponding to the first sub region SR1, and generate the comparison data CD corresponding to the first sub region SR1 by comparing the probability data with reference data. Thereafter, the processor 120 may use the decision model 122 to compare the comparison data CD with the first threshold value and may or may not update the motion count value based on a comparison result. The above process may be performed based on the event data ED corresponding to the second sub region SR2, and similarly, may be performed based on the plurality of pieces of event data ED respectively corresponding to the third sub region SR3 to a twenty-fifth sub region SR25. As the processor 120 performs the above process based on the plurality of pieces of event data ED respectively corresponding to a first sub region SR1 to the twenty-fifth sub region SR25, the motion count value may be updated or not updated. For example, referring to FIG. 5, determining whether to update the motion count value may be performed with respect to the comparison data CD respectively corresponding to a plurality of sub regions SR1 to SR25 of FIG. 5, and as a result, determining may be performed 25 times. Through the above process, a motion count value finally generated based on an event occurred during one sampling time may be referred to as an updated motion count value (or a final motion count value). For example, referring to FIG. 5, the comparison data CD corresponding to each of the first sub region SR1, a fifth sub region SR5, and a tenth sub region SR10 among the comparison data CD respectively corresponding to the plurality of sub regions SR1 to SR25 is greater than the first threshold value, the processor 120 may generate the updated motion count value by updating the motion count value three times.

The processor 120 may use the decision model 122 to determine whether an object moves by comparing the final motion count value with a preset (or, alternatively, desired or determined) second threshold value. That is, the processor 120 may determine whether an event occurred in response to a change in light intensity is noise or is caused by an operation of an actual object. For example, referring to FIG. 5, when the movement of an object is relatively large, the comparison data CD greater than or equal to the first threshold value among 25 comparison data CD respectively corresponding to the plurality of sub regions SR1 to SR25 may be more than when the movement of the object is relatively small. Accordingly, an initial motion count value may be updated (e.g., increased) by the number of comparison data equal to or greater than the first threshold value so that the final motion count value may be greater than the second threshold value. The processor 120 may determine that there is the movement of the object based on a result of comparing the final motion count value and the second threshold value and generate the motion signal MS. The vision sensor may convert an operation mode from a monitoring mode to an active mode based on the generated motion signal MS. The second threshold value is a value that may be a reference for determining whether the object moves, and may be, for example, a preset (or, alternatively, desired or determined) value or a value set by a user.

As described above, the processor 120 according to the inventive concepts may generate the motion signal MS by determining whether various conditions are satisfied based on the event data ED. A condition for generating the motion signal MS according to the inventive concepts may be referred to as a motion condition, and a motion condition in the first monitoring mode and a motion condition in the second monitoring mode may be different from each other.

18

Figure 7:
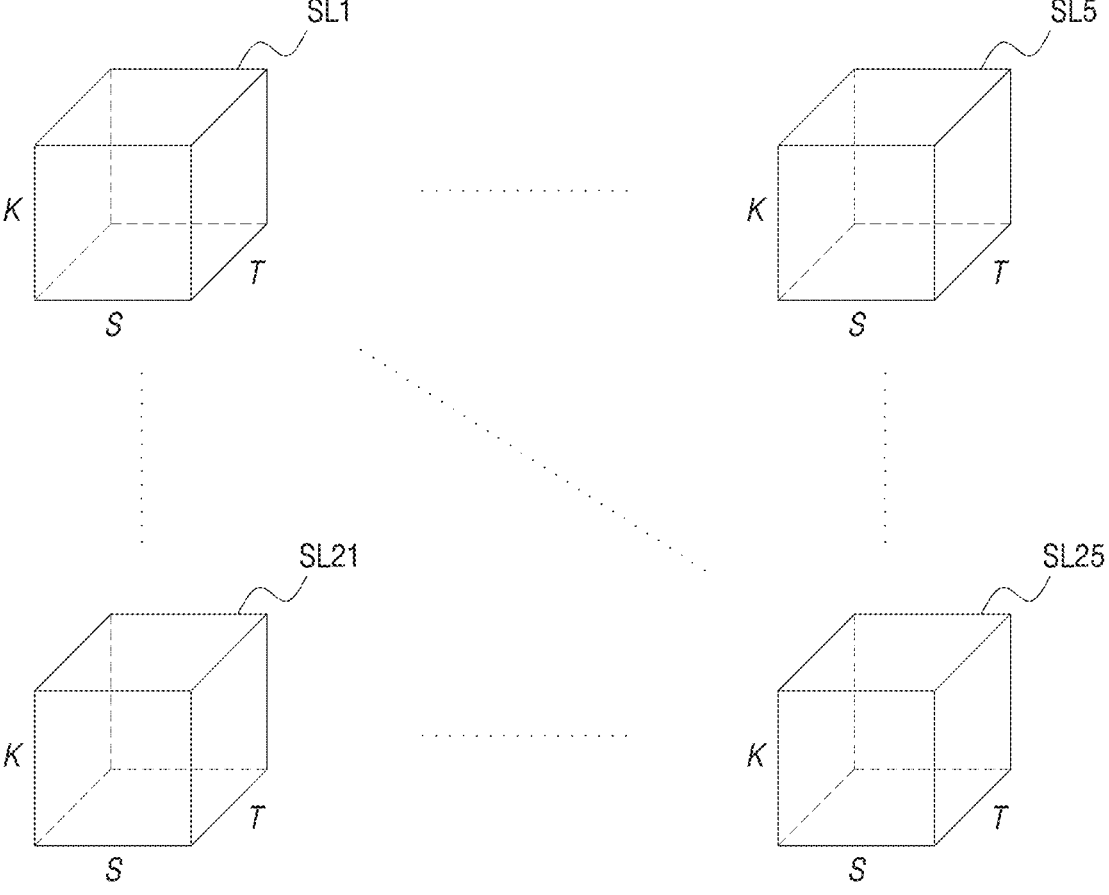
FIG. 7 is a diagram for explaining event data according to some example embodiments.

FIG. 7 is a diagram for explaining event data according to some example embodiments.

FIG. 7 illustrates a plurality of slots SL1 to SL25 respectively corresponding to the plurality of sub regions SR1 to SR25 of FIG. 5.

The plurality of slots SL1 to SL25 visually represent reception of event data respectively corresponding to the sub regions SR1 to SR25 respectively corresponding thereto during the sampling time T. For example, the first slot SL1 represents event data generated with respect to pixels that detect a change in light among pixels included in the first sub region SR1 in units of the sampling time T. For convenience of explanation, only some of the slots are described, for example, slots SL1, SL5, SL21, and SL25, is described, but the following description may be equally applied to the remaining slots of FIG. 7.

The number of the plurality of slots SL1 to SL25 and the sampling time T of FIG. 7 are examples for convenience of explanation, and the inventive concepts are not limited thereto.

Figure 8:
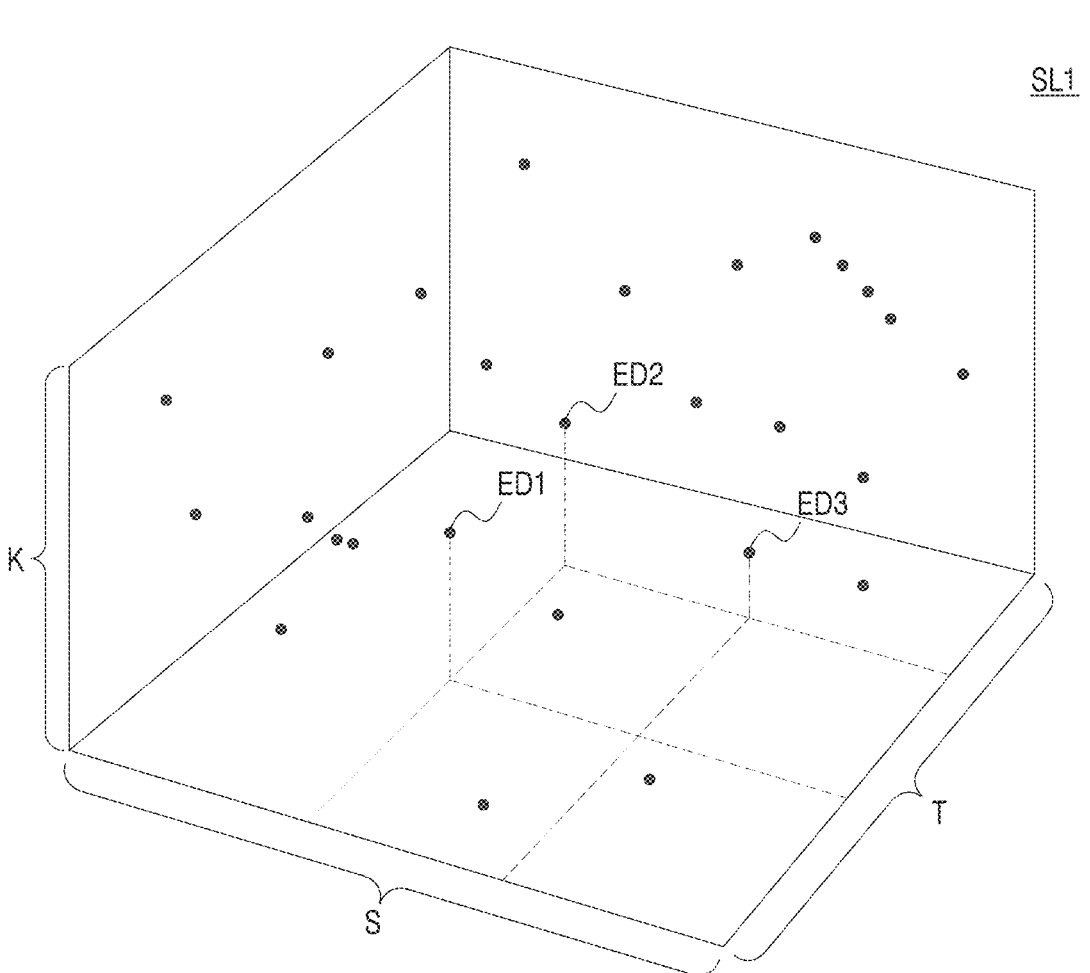
FIG. 8 is a diagram for explaining probability data according to some example embodiments.

FIG. 8 is a diagram for explaining probability data according to some example embodiments.

FIG. 8 illustrates event data corresponding to the first slot SL1 of FIG. 7 and the first sub region SR1 of FIG. 5 received by the processor 120 of FIG. 1 during the sampling time T. For convenience of explanation, only the first slot SL1 is described, but the following description may be equally applied to the remaining slots SL2 to SL25 of FIG. 7.

Referring to FIG. 8, first event data ED1 and second event data ED2 are generated to respectively correspond to two events detected at different times by the same pixel included in the first sub region SR1 of FIG. 5.

Referring to FIG. 8, the second event data ED2 and third event data ED3 are generated to respectively correspond to two events detected at the same time by different pixels included in the first sub region SR1 of FIG. 5.

Referring to the description above, the processor 120 of FIG. 6A may count the number of event data included in the first slot SL1 by using the probability calculation model 121 and obtain the probability data corresponding to the first sub region SR1. Alternatively, the probability data may be generated by a method of classifying the event data included in the first slot SL1 according to polarities, applying a weight, or another like method.

FIG. 8 does not show polarities of event data included in the first slot SL1, but event data included in one slot according to the inventive concepts may indicate polarities. For example, event data based on an event that has occurred when intensity of light increases and event data based on an event that has occurred when intensity of light decreases may have different polarities and may be expressed differently.

Figure 9:
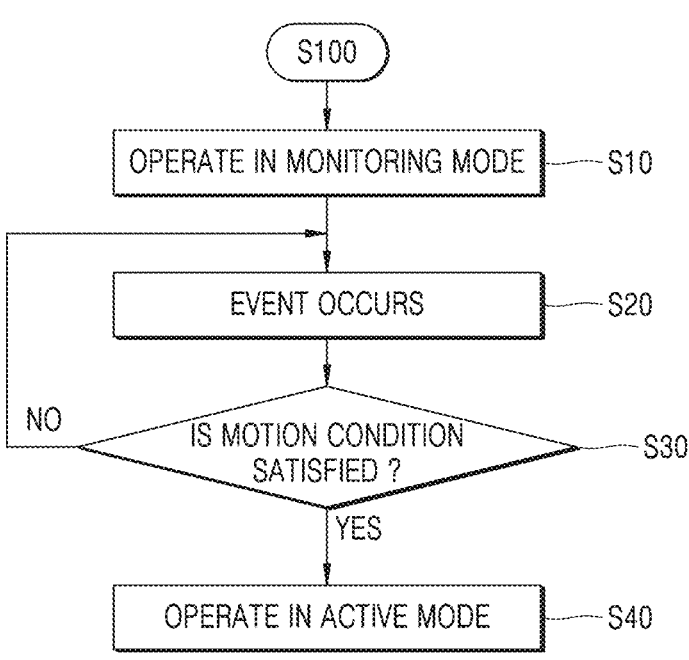
FIG. 9 is a flowchart illustrating an operating method of a vision sensor according to some example embodiments.

FIG. 9 is a flowchart illustrating an operating method of a vision sensor according to some example embodiments.

In operation S10, the vision sensor may operate in a monitoring mode. The monitoring mode is a mode in which less power is consumed than in an active mode. For example, the vision sensor may perform a readout operation on all pixels included in a pixel array when operating in the active mode, but may read out the pixels in a binning method such as 2X2, 3X3, 4X4, etc. in the monitoring mode. Accordingly, the vision sensor may consume less power when operating in the monitoring mode than when operating in the active mode. In addition to the above example, power consumed by the vision sensor in the monitoring mode may be less than power consumed in the active mode by various methods such as a method of operating a clock signal at a lower frequency in the monitoring mode than in the active mode.

According to some example embodiments, the vision sensor may start operating in a sleep mode. Unlike the vision sensor detecting the movement of an object with low power in the monitoring mode, the vision sensor may not detect the movement of the object in the sleep mode. The vision sensor may convert from the sleep mode to the monitoring mode to detect the movement of the object.

In operation S20, the vision sensor may detect the movement of the object. As described above, the vision sensor may operate in the monitoring mode, generate an event in response to a change in light intensity in the monitoring mode, and generate event data based on the generated event.

In operation S30, the vision sensor may determine whether a motion condition is satisfied. For example, a processor included in the vision sensor may determine whether a motion condition is satisfied based on the generated event data. Determination of whether the motion condition is satisfied may be performed by the processor included in the vision sensor, but is not limited thereto and may be performed by an external processor. As described above, the motion condition may mean a condition for determining whether the movement of the object exists, that is, a condition for generating a motion signal.

As described above, the occurrence of an event may be caused by a change in light intensity. However, in addition to the change in light intensity according to the movement of the object to be detected by the vision sensor, an event may occur due to shaking of the vision sensor itself or an environment factor, and as a result, an unnecessary detection process may be performed. Accordingly, the motion condition may be a preset (or, alternatively, desired or determined) condition in order not to perform an unnecessary detection process by distinguishing an event caused by shaking of the vision sensor itself from an event caused by the movement of a real object. A specific motion condition according to the inventive concepts are redundant with descriptions given above and below, and thus, a description thereof is omitted.

The vision sensor may maintain the monitoring mode when the motion condition is not satisfied, operate in the monitoring mode, and detect the movement of the object.

In operation S40, the vision sensor may operate in an active mode. When the motion condition is satisfied, the vision sensor may generate a motion signal and operate in the active mode by converting a mode from the monitoring mode to the active mode.

According to some example embodiments, the monitoring mode may include a first monitoring mode and a second monitoring mode. An operation in which the vision sensor converts an operation mode from the monitoring mode to the active mode may include an operation of converting the operation mode from the first monitoring mode to the active mode and an operation of converting the operation mode from the second monitoring mode to the active mode.

Hereinafter, an operating method of a vision sensor according to the inventive concepts are described with respect to a motion condition with reference to FIGS. 10 to 13.

FIG. 10 is a flowchart illustrating an operating method of a vision sensor according to some example embodiments.

For example, the flowchart of FIG. 10 shows a method, performed by the vision sensor including a processor, of determining whether an object moves in a first monitoring mode. FIG. 10 may be described with reference to FIGS. 1 to 9, and redundant descriptions thereof may be omitted.

In operation S100, the vision sensor may generate a plurality of pieces of event data corresponding to pixels in which an event has occurred.

In operation S200, the vision sensor may generate first probability data based on the plurality of pieces of event data based on an event occurred during a first sampling time. As described above, the first sampling time may be set differently according to an environment photographed by the vision sensor.

In operation S300, the vision sensor may generate comparison data based on a difference between the first probability data and preset (or, alternatively, desired or determined) reference data by comparing the first probability data with the preset (or, alternatively, desired or determined) reference data. When the vision sensor operates in a first monitoring mode, the reference data may be second probability data generated by the vision sensor based on a plurality of events generated during a second sampling time temporally preceding the first sampling time, and, when the vision sensor operates in a second monitoring mode, the reference data may be a preset (or, alternatively, desired or determined) threshold value.

In operations S400, S500, and S600, the vision sensor may determine whether to update a motion count value by comparing the comparison data with a preset (or, alternatively, desired or determined) first threshold value. For example, when the comparison data is greater than the first threshold value, the vision sensor may increase the motion count value. Conversely, when the comparison data is equal to or less than the first threshold value, the vision sensor may maintain the current motion count value without updating the current motion count value. Here, the first threshold value is a preset (or, alternatively, desired or determined) value and may be a value related to sensitivity of a movement change. For example, when the first threshold value is relatively large, the motion count value may not be updated even when the difference between the first probability data and the reference data is large, and thus, the motion count value is not updated with respect to a relatively large movement, even when the movement change is relatively large, the vision sensor may determine that there is no movement of the object. The vision sensor may update or not update the motion count by comparing the comparison data with the first threshold value, thereby generating an updated motion count value (or a final motion count value).

In operations S700, S800, and S900, the vision sensor may determine whether the object moves by comparing the final motion count value with a preset (or, alternatively, desired or determined) second threshold value. For example, when the final motion count value is equal to or greater than the preset (or, alternatively, desired or determined) second threshold value, the vision sensor may determine that there is the movement of the object and generate a motion signal.

The vision sensor according to the inventive concepts may repeatedly perform the above process in units of sampling time. Accordingly, the vision sensor according to the inventive concepts may determine whether the object moves at every plurality of consecutive sampling times. In the first monitoring mode according to the inventive concepts, the processor may initialize the final motion count value after determining whether the object moves based on the final motion count value generated based on event data generated during one sampling time.

FIG. 11 is a flowchart illustrating an operating method of a vision sensor according to some example embodiments. For example, the flowchart of FIG. 11 shows the operating method of the vision sensor including a processor in a first monitoring mode. FIG. 11 may be described with reference to FIG. 10, and descriptions of operations other than operations S410 and S610 are redundant with those described with reference to FIG. 10, and thus, are omitted.

In operation S410, the vision sensor may compare comparison data corresponding to one sub region with a preset (or, alternatively, desired or determined) first threshold value. As described above, the comparison data corresponding to one sub region is a difference between first probability data corresponding to the one sub region and reference data.

In operation S610, the vision sensor may determine whether each of a plurality of pieces of comparison data respectively corresponding to a plurality of sub regions has been compared with the first threshold value. Accordingly, the vision sensor may determine whether all of the plurality of pieces of comparison data respectively corresponding to the plurality of sub regions generated during a first sampling time has been compared with the first threshold value, when it is determined that each of the plurality of pieces of comparison data corresponding to each of the plurality of sub regions has been compared with the first threshold value, the vision sensor may perform operation S700, and when there is comparison data that has not been compared with the first threshold value among the plurality of pieces of comparison data, the vision sensor may repeat operations S410, S500, and S600 until all of the plurality of pieces of comparison data respectively corresponding to the plurality of sub regions has been compared with the first threshold value.

For example, referring to FIG. 5, the vision sensor may determine whether to update a motion count value by comparing comparison data generated based on a result of comparing the first probability data corresponding to the first sub region SR1 with the reference data with the first threshold value, and, because comparison data corresponding to each of a plurality of sub regions includes comparison data that has not been compared with the first threshold value (e.g., comparison data corresponding to each of the second sub region SR2 to the twenty-fifth sub region SR25), the vision sensor may repeat comparison operations S410, S500, and S600 described above on the comparison data corresponding to the second sub region SR2 to the comparison data corresponding to the twenty-fifth sub region SR25. The vision sensor may generate an updated motion count value (or a final motion count value) based on a result of comparing each of the plurality of pieces of comparison data corresponding to each of the plurality of sub regions SR2 to SR25 with the first threshold value, and compare the generated final motion count value with a preset (or, alternatively, desired or determined) second threshold value (see operation S700). The vision sensor may compare the second threshold value with the updated motion count value, when it is determined that there is the movement of an object, generate a motion signal, convert an operation mode from a monitoring mode to an active mode based on the motion signal.

Figure 12:
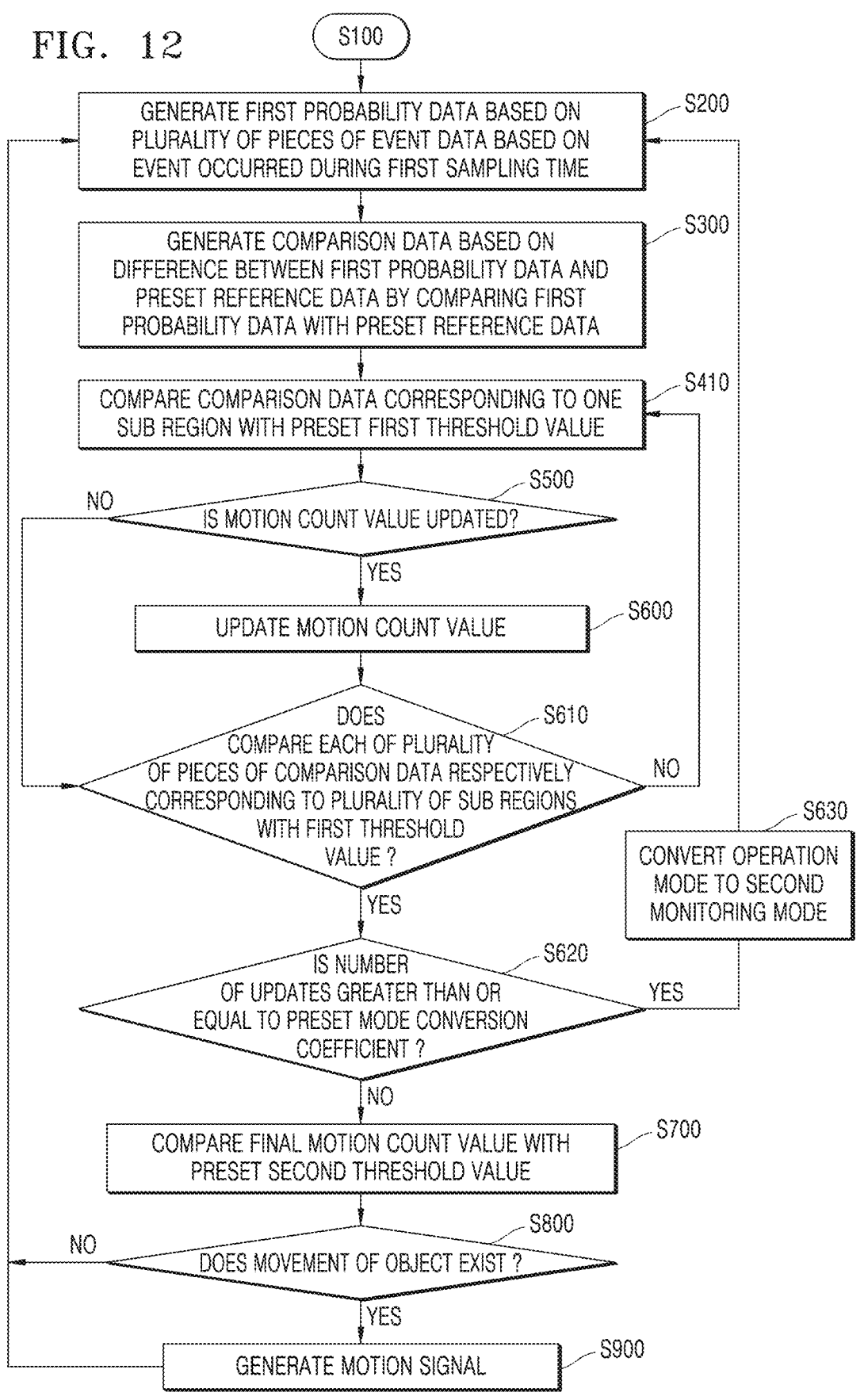
FIG. 12 is a flowchart illustrating an operating method of a vision sensor according to some example embodiments.

FIG. 12 is a flowchart illustrating an operating method of a vision sensor according to some example embodiments. For example, the flowchart of FIG. 12 shows the operating method of the vision sensor including a processor in a first monitoring mode, and explains operations S620 and S630 added in comparison with FIG. 11. FIG. 12 may be described with reference to FIGS. 10 and 11, descriptions of operations other than operations S620 and S630 are redundant with those described with reference to FIGS. 10 and 11, and thus, are omitted.

In operation S620, the vision sensor may determine whether the number of updates is greater than or equal to a preset (or, alternatively, desired or determined) mode conversion coefficient, and based on determination, in operation S630, the vision sensor may convert an operation mode from the first monitoring mode to a second monitoring mode. For example, the vision sensor may operate in the first monitoring mode, compare the number of times a motion count value is updated through operations S410 to S610 with the preset (or, alternatively, desired or determined) mode conversion coefficient, and when the number of updates is greater than or equal to the mode conversion coefficient, convert the operation mode from the first monitoring mode to the second monitoring mode.

The first monitoring mode according to the inventive concepts may refer to a mode in which the vision sensor operates when photographing an environment where there is no continuous movement across the entire region of a frame corresponding to a region of the pixel array 111 of FIG. 2, and the second monitoring mode may refer to a mode in which the vision sensor operates when photographing an environment where there is the continuous movement throughout the frame. For example, the environment where there is the continuous movement throughout the frame may be a snowy environment. In the snowy environment, the vision sensor may determine that there is the continuous motion across the entire area of the frame. However, snow may not correspond to an object that a user of the vision sensor wants to detect, and an event occurred by the movement of snow may correspond to noise. Because the movement occurs across the entire area of the frame and the event occurs in the snowy environment, the number of comparison data that is equal to or greater than a first threshold value may be greater than or equal to the preset (or, alternatively, desired or determined) mode conversion coefficient among comparison data corresponding to each of a plurality of sub regions, and the vision sensor may change the operation mode from the first monitoring mode to the second monitoring mode.

As described above, the vision sensor according to the inventive concepts may convert the operation mode from the first monitoring mode to the second monitoring mode, and convert the operation mode from the second monitoring mode to the first monitoring mode again according to a preset (or, alternatively, desired or determined) time. The preset (or, alternatively, desired or determined) time may be set by the user. Referring to FIG. 12, only converting of the operation mode from the first monitoring mode to the second monitoring mode has been described, but the vision sensor may operate in the second monitoring mode from the beginning according to user's settings.

Figure 13:
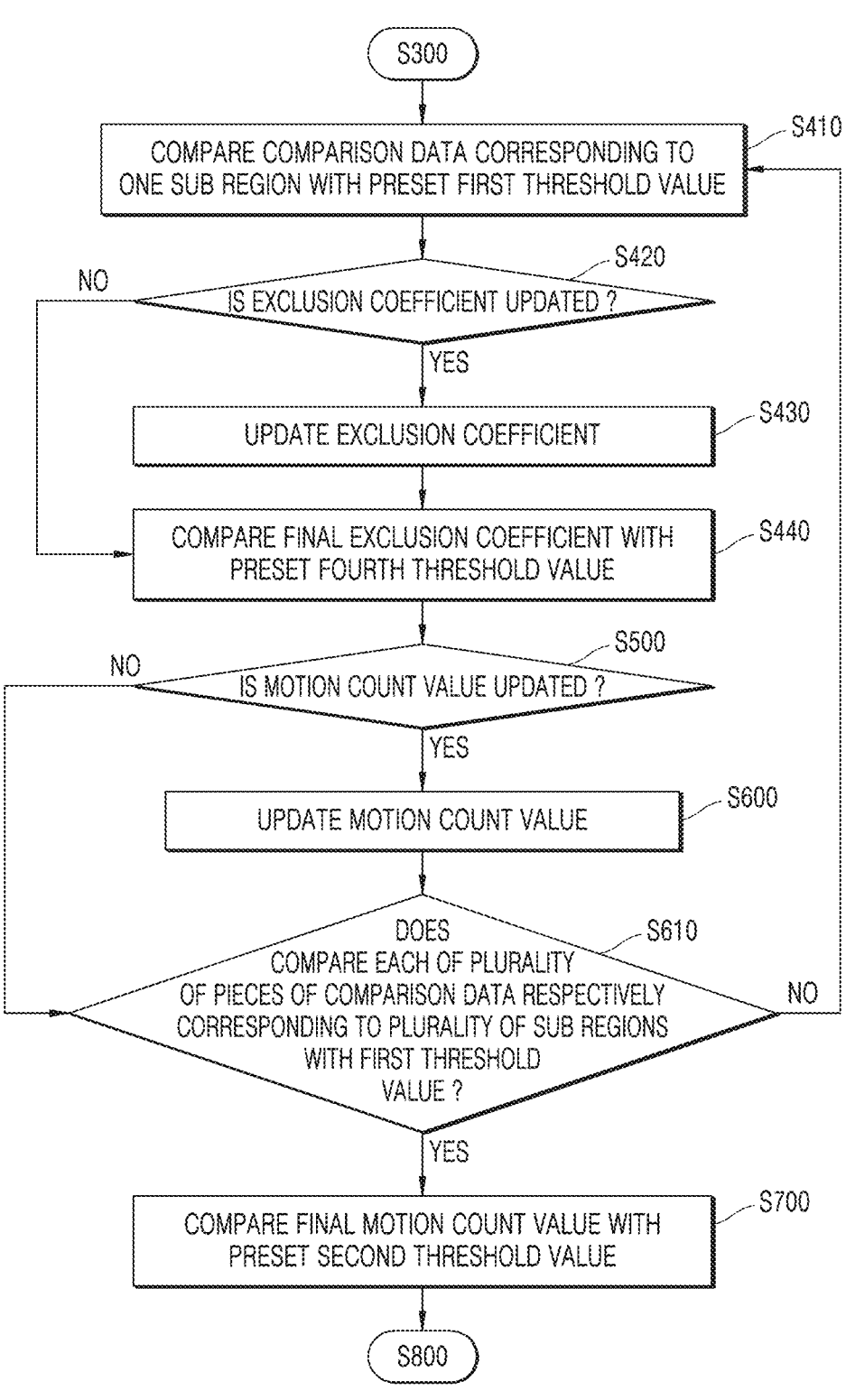
FIG. 13 is a flowchart illustrating an operating method of a vision sensor according to some example embodiments.

FIG. 13 is a flowchart illustrating an operating method of a vision sensor according to some example embodiments. For example, the flowchart of FIG. 13 shows a method, performed by the vision sensor including a processor, of determining whether an object moves in a second monitoring mode, and explains operations S420, S430, and S440 added in comparison with FIG. 11. FIG. 13 may be described with reference to FIGS. 11 and 12, and descriptions of operations other than operations S420, S430, and S440 are redundant with those described with reference to FIGS. 10 and 11, and thus, are omitted.

The operating method of the vision sensor shown in FIG. 13 may be the operating method of the vision sensor having an operation mode converted from a first monitoring mode to the second monitoring mode according to operations S620 and S630 of FIG. 12.

In operation S420, the vision sensor may determine whether to update an exclusion coefficient corresponding to one sub region based on a result of comparing comparison data corresponding to the one sub region and a first threshold value in operation S410. In operation S430, the vision sensor may update the exclusion coefficient according to a result of determining whether to update the exclusion coefficient in operation S420. Here, the exclusion coefficient is a coefficient indicating the degree to which an event has continuously occurred by at least one pixel included in a sub region corresponding thereto. An exclusion coefficient corresponding to each of a plurality of sub regions may be continuously updated as a plurality of continuous sampling times are repeated. For example, referring to FIG. 5, an initial exclusion coefficient corresponding to the first sub region SR1 may be 1, and, when comparison data based on a result of comparing first probability data corresponding to the first sub region SR1 generated based on a plurality of pieces of event data generated during a first sampling time with a third threshold value (reference data in the second monitoring mode) is equal to or greater than the first threshold value, the vision sensor may increase the exclusion coefficient corresponding to the first sub region SR1 (e.g., update the exclusion coefficient to 2). When comparison data based on a result of comparing the first probability data corresponding to the first sub region SR1 generated based on a plurality of pieces of event data generated during a second sampling time temporally following the first sampling time with the third threshold value (reference data described above) is equal to or greater than the first threshold value, the vision sensor may increase the exclusion coefficient corresponding to the first sub region SR1 once more (e.g., update the exclusion coefficient to 3). The time of the first sampling time may be the same as the time of the second sampling time. The third threshold value is a value that may be a reference for determining the degree that an event occurs, and may be, for example, a preset (or, alternatively, desired or determined) value or a value set by a user. The exclusion coefficient may be updated or maintained according to repetition of the above process, and the latest exclusion coefficient according to the latest update determination may be referred to as an updated exclusion coefficient (or a final exclusion coefficient).

Referring to the above example, with respect to a sub region in which an event has continuously occurred, an exclusion coefficient corresponding to the sub region may be continuously updated. As a result, the event occurring in the sub region in which the event has continuously occurred may be determined as noise, and excluded in determining whether the object moves. Therefore, when the vision sensor wants to detect the movement of the object in a snowy environment, a sub region in which an event caused by a continuous movement (the movement of snow) has occurred among a plurality of sub regions may be determined as an exclusion region, and a sub region that is not determined as the exclusion region may be determined as a valid region. The vision sensor may determine whether to update a motion count based on comparison data corresponding to each of sub regions included in the valid region, thereby preventing, or reducing, determination of the movement due to an unnecessary event (an event occurred in response to the movement of snow). The exclusion region and the valid region are described below with reference to operation S440.

The updated exclusion coefficient according to the inventive concepts may be a value between preset (or, alternatively, desired or determined) upper and lower limits. The upper and lower limits are preset (or, alternatively, desired or determined) values so that the exclusion coefficient has a value within an appropriate range for determination of a continuous movement, and may also be set by the user.

When the exclusion coefficient corresponding to each of the plurality of sub regions is only updated according to a result of comparing the comparison data and the first threshold value, the sub region once determined as the exclusion region may not be included in the valid region. Accordingly, in order to prevent or reduce this problem, the processor according to the inventive concepts may reset the updated exclusion coefficient corresponding to each of the plurality of sub regions at a preset (or, alternatively, desired or determined) period. When continuous event occurrence disappears in the sub region determined as the exclusion region, the sub region may be prevented or reduced from being continuously determined as the exclusion region, by resetting the exclusion coefficient. The preset (or, alternatively, desired or determined) period may be a times the sampling time, and a may be an integer greater than 1. Resetting the exclusion coefficient may include inversely updating the exclusion coefficient. Here, inversely updating means updating as opposed to updating the exclusion coefficient described above. For example, when updating the exclusion coefficient means increasing the exclusion coefficient, inversely updating may mean decreasing the exclusion coefficient. For example, according to some example embodiments, there may be an increase in accuracy of motion detection, power consumption, and noise removal based on the above methods. Therefore, the improved devices and methods overcome the deficiencies of the conventional devices and methods to motion detection and noise removal while reducing resource consumption and increasing data clarity. For example, by using the disclosed methods, the vision sensor 110 may require fewer resources, such as memory access and/or power to drive circuitry to produce a determination of an event occurring.

In operation S440, the vision sensor may compare the final exclusion coefficient with a preset (or, alternatively, desired or determined) fourth threshold value. In operation S500, the vision sensor may determine whether to update the motion count value based on a comparison result in operation S440 and a comparison result operation S410. When the final exclusion coefficient corresponding to one sub region is equal to or greater than the fourth threshold value, even when the comparison data corresponding to the one sub region is greater than the first threshold value (the comparison result in operation S410), the vision sensor may maintain the motion count value without updating the motion count value. For example, referring to FIG. 5, in operation S500, the vision sensor may increase the motion count value when the final exclusion coefficient corresponding to the first sub region SR1 is equal to or less than the fourth threshold value (in this case, the first sub region SR1 is the valid region), and when the comparison data corresponding to the first sub region SR1 is equal to or greater than the first threshold value. However, the vision sensor may maintain the motion count value without updating the motion count value when the final exclusion coefficient corresponding to the first sub region SR1 exceeds the fourth threshold value (in this case, the first sub region SR1 is the exclusion region), and when the comparison data corresponding to the first sub region SR1 is less than the first threshold value. The fourth threshold value is a value that may be a reference for determining a sub region in which an event has continuously occurred, and may be a preset (or, alternatively, desired or determined) value or a value set by a user.

By adding operations S420, S430, and S440, the vision sensor may exclude event data corresponding to the sub region in which the event has continuously occurred among the plurality of sub regions when determining whether to update the motion count. As a result, in the second monitoring mode, the vision sensor may exclude the sub region in which the event has continuously occurred.

As described above, among the plurality of sub regions, a region including sub regions other than the sub region (the exclusion region) in which the event has continuously occurred may be referred to as the valid region. The valid region and the exclusion region may be set based on a result of comparing the updated exclusion coefficient corresponding to each of the plurality of sub regions with the fourth threshold value. As described above, the vision sensor operating in the second monitoring mode according to the inventive concepts may divide the plurality of sub regions into the exclusion region and the valid region, and update the motion count value based on the comparison data corresponding to the sub region included in the set valid region. Then, as in the first monitoring mode, the vision sensor may generate a motion signal based on a result of comparing the updated motion count value with the second threshold value.

The operating method of the vision sensor according to the inventive concepts may also be applied to an operating method of an image sensor. For example, the image sensor may generate a frame for each frame period and generate a difference between pixel values corresponding to the same region in two or more consecutive frames. Here, the pixel value may be a value based on a pixel signal generated from each of a plurality of pixels included in the image sensor, and the difference between pixel values corresponding to the same region may correspond to the event data described above.

Figure 14:
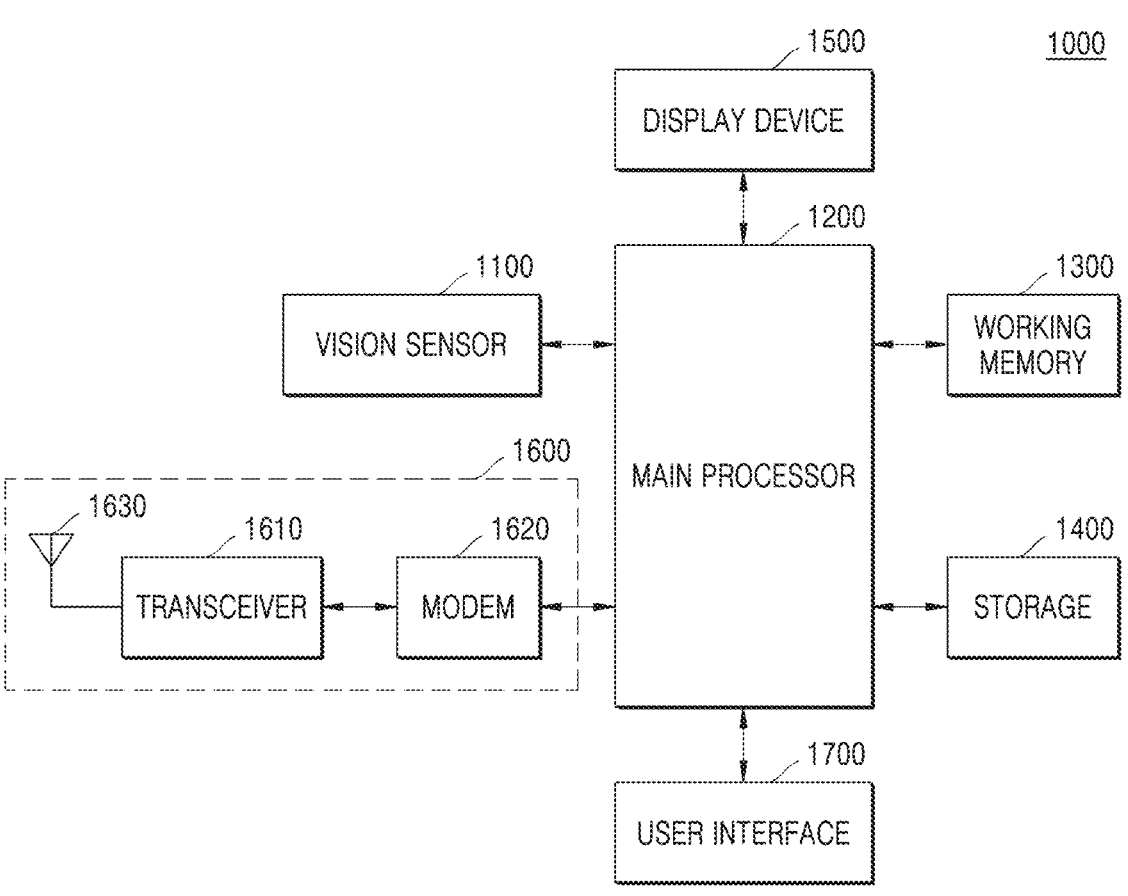
FIG. 14 is a block diagram illustrating an electronic device to which a vision sensor according to some example embodiments is applied.

FIG. 14 is a block diagram illustrating an electronic device to which a vision sensor according to some example embodiments is applied.

Referring to FIG. 14, the electronic device 1000 may include the vision sensor 1100, a main processor 1200, a working memory 1300, a storage 1400, a display device 1500, a communicator 1600, and a user interface 1700. The vision sensor 1100 may be the vision sensor 100 described above with reference to FIGS. 1 and 2.

The vision sensor 1100 may generate event data (e.g., ED of FIGS. 1 and 2) by sensing a movement of an object and may transmit the event data ED to the main processor 1200. The main processor 1200 may control overall operations of the electronic device 1000 and processes the event data ED received from the vision sensor 1100 to detect the movement of the object. For example, the main processor 1200 may perform operations such as whether to update a motion count value, whether to update an exclusion coefficient, and comparing each of a plurality of pieces of data with a preset (or, alternatively, desired or determined) threshold value described above, and determine whether the object moves according to the above operations.

The working memory 1300 may store data used in operations of the electronic device 1000. For example, the working memory 1300 may temporarily store packets or frames processed by the processor 1200. For example, the working memory 1300 may include a volatile memory such as a dynamic RAM (DRAM), synchronous DRAM (SDRAM), etc., and/or a non-volatile memory such as a phase change RAM (PRAM), a magneto-resistive RAM (MRAM), resistive RAM (ReRAM), a ferro-electric RAM (FRAM), etc.

The storage 1400 may store data that is requested to store from the main processor 1200 or other components. The storage 1400 may include a non-volatile memory such as a flash memory, PRAM, MRAM, ReRAM, FRAM, etc.

The display device 1500 may include a display panel, a display drive circuit, and a display serial interface (DSI). For example, the display panel may be implemented by using various devices such as a liquid crystal display (LCD) device, a light emitting diode (LED) display device, an organic LED (OLED) display device, an active matrix OLED (AMOLED) display device, etc. The display drive circuit may include a timing controller that is necessary for driving the display panel, a source driver, etc. The DSI host built in the main processor 1200 may perform a serial communication with the display panel via the DSI.

The communicator 1600 may exchange signals with an external device/system via an antenna 1630. A transceiver 1610 and a modem (modulator/demodulator) 1620 of the communicator 1600 may process the signals exchanged with the external device/system according to wireless communication regulations such as long term evolution (LTE), worldwide interoperability for microwave access (WIMAX), global system for mobile communication (GSM), code division multiple access (CDMA), Bluetooth, near field communication (NFC), wireless fidelity (Wi-Fi), radio frequency identification (RFID), etc.

The user interface 1700 may include at least one of a keyboard, a mouse, a keypad, a button, a touch panel, a touch screen, a touch pad, a touch ball, a gyroscope sensor, a vibration sensor, an acceleration sensor, etc.

The components of the electronic device 1000, for example, the vision sensor 1100, the main processor 1200, the working memory 1300, the storage 1400, the display device 1500, the communicator 1600, and the user interface 1700, may exchange the data based on one or more of various interface regulations such as universal serial bus (USB), small computer system interface (SCSI), MIPI, I2C, peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), enhanced IDE (EIDE), nonvolatile memory express (NVMe), universal flash storage (UFS), etc.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

While the inventive concepts have been particularly shown and described with reference to embodiments thereof, it will be understood that various changes in form and details may be made therein without departing from the spirit and scope of the following claims.

What is claimed is:

1. A vision sensor comprising:
a pixel array comprising a plurality of pixels arranged in a matrix form;
an event detection circuit configured to detect whether an event has occurred in each of the plurality of pixels during a first sampling time and generate a plurality of pieces of first event data respectively corresponding to pixels in which the event has occurred; and
a processor configured to receive the plurality of pieces of first event data and generate a motion signal based on the plurality of pieces of first event data and reference data,
wherein
the pixel array includes a plurality of sub regions including at least one pixel,
the reference data is a third threshold value, and
the processor is configured to
generate a plurality of pieces of first probability data respectively corresponding to the plurality of sub regions based on the plurality of pieces of first event data,
compare each of the plurality of pieces of first probability data with the third threshold value corresponding to the reference data,
generate a plurality of pieces of comparison data respectively corresponding to the plurality of sub regions,
update a plurality of exclusion coefficients respectively corresponding to the plurality of sub regions based on the plurality of pieces of comparison data, and
set a valid region based on a result of comparing each of the plurality of updated exclusion coefficients with a fourth threshold value.

2. The vision sensor of claim 1, wherein the processor is configured to convert an operation mode of the vision sensor from a monitoring mode to an active mode based on the motion signal.

3. The vision sensor of claim 1, wherein
the event detection circuit is configured to detect whether an event has occurred in each of the plurality of pixels during a second sampling time temporally preceding the first sampling time, and generate a plurality of pieces of second event data respectively corresponding to pixels in which the event has occurred, and
the reference data is based on the plurality of pieces of second event data.

4. The vision sensor of claim 3, wherein a time of the first sampling time is equal to a time of the second sampling time.

5. The vision sensor of claim 3,
wherein the processor is configured to generate first probability data based on the plurality of pieces of first event data, generate second probability data corresponding to the reference data based on the plurality of pieces of second event data, generate comparison data based on a difference between the first probability data and the second probability data, and generate a motion signal based on a result of comparing the comparison data with a first threshold value.

6. The vision sensor of claim 5, wherein
the pixel array includes a plurality of sub regions including at least one pixel,
the first probability data and the second probability data correspond to an equal sub region, and
the processor is configured to generate a plurality of pieces of comparison data respectively corresponding to the plurality of sub regions, update a motion count value based on a result of comparing each of the plurality of pieces of comparison data with the first threshold value, and generate a motion signal based on a result of comparing the updated motion count value with a second threshold value.

7. The vision sensor of claim 1, wherein
the valid region includes at least one sub region, and
the processor is configured to generate the motion signal based on at least one piece of comparison data corresponding to the at least one sub region included in the valid region.

8. The vision sensor of claim 7, wherein the processor is configured to update a motion count value based on a result of comparing the at least one piece of comparison data corresponding to the at least one sub region included in the valid region with a first threshold value, and generate the motion signal based on a result of comparing the updated motion count value with a second threshold value.

9. The vision sensor of claim 1, wherein the processor is configured to reset each of the plurality of updated exclusion coefficients respectively corresponding to the plurality of sub regions to a value at each period.

10. An operating method of a vision sensor comprising a pixel array comprising a plurality of pixels, the operating method comprising:
generating a plurality of pieces of event data respectively corresponding to the pixels in which an event has occurred among the plurality of pixels;
generating first probability data based on the plurality of pieces of event data based on an event occurring during a first sampling time;
generating comparison data based on a difference between the first probability data and reference data by comparing the first probability data with the reference data;
determining whether to update a motion count value by comparing the comparison data with a first threshold value; and
generating a motion signal based on a result of comparing a final motion count value generated by determining whether to update the motion count value with a second threshold value,
wherein
the pixel array includes a plurality of sub regions including at least one pixel,
the generating of the first probability data includes generating a plurality of pieces of first probability data respectively corresponding to the plurality of sub regions based on the plurality of pieces of first event data,
the generating of the comparison data includes generating a plurality of pieces of comparison data respectively corresponding to the plurality of sub regions by comparing each of the plurality of pieces of first probability data respectively corresponding to the plurality of sub regions with a third threshold value corresponding to the reference data, and
the determining of whether to update the motion count value includes
determining whether to update a plurality of exclusion coefficients respectively corresponding to the plurality of sub regions based on the plurality of pieces of comparison data respectively corresponding to the plurality of sub regions; and setting a valid region based on a plurality of final exclusion coefficients respectively corresponding to the plurality of sub regions generated by determining whether to update the plurality of exclusion coefficients.

11. The operating method of claim 10, wherein the determining of whether to update the motion count value further includes determining an operation mode of the vision sensor by comparing a number of updates of the motion count value with a mode conversion coefficient.

12. The operating method of claim 10, further comprising:

generating second probability data based on the plurality of pieces of event data based on an event occurred during a second sampling time temporally preceding the first sampling time, wherein the reference data is the second probability data.

13. The operating method of claim 12, wherein the pixel array includes a plurality of sub regions including at least one pixel, and the first probability data and the second probability data correspond to an equal sub region, and the generating of the comparison data includes generating a plurality of pieces of comparison data respectively corresponding to the plurality of sub regions.

14. The operating method of claim 13, wherein the determining of whether to update the motion count value includes updating the motion count value based on a result of comparing each of the plurality of pieces of comparison data with the first threshold value.

15. The operating method of claim 10, wherein the valid region includes at least one sub region, and the determining of whether to update the motion count value includes determining whether to update the motion count value by comparing comparison data corresponding to the at least one sub region included in the valid region with the first threshold value.

16. The operating method of claim 10, further comprising: resetting each of the plurality of final exclusion coefficients respectively corresponding to the plurality of sub regions to a value at each period.

17. The operating method of claim 16, wherein the period is n times the first sampling time, and n is an integer greater than or equal to 1.

* * * * *